United States Patent [19]
Diaz

[11] Patent Number: 5,836,861
[45] Date of Patent: Nov. 17, 1998

[54] FILTER ASSEMBLY APPARATUS

[75] Inventor: Jose A. Diaz, Tampa, Fla.

[73] Assignee: Precisionaire, Inc., Bartow, Fla.

[21] Appl. No.: 739,759

[22] Filed: Oct. 29, 1996

[51] Int. Cl.⁶ .............................. B31D 5/00; B01D 27/00
[52] U.S. Cl. ........................... 493/386; 493/941; 29/509; 55/511
[58] Field of Search ........................... 493/374, 177–179, 493/183, 453, 437, 438, 941, 386, 344, 379; 264/DIG. 48; 29/509, 163.8, 902; 55/511; 53/382.3, 387.1

[56] References Cited

U.S. PATENT DOCUMENTS

| | | |
|---|---|---|
| 2,161,831 | 6/1939 | Manning . |
| 2,351,670 | 6/1944 | Desch . |
| 3,374,604 | 3/1968 | Roesner . |
| 3,452,653 | 7/1969 | Berny . |
| 4,086,071 | 4/1978 | Champlin ................................... 55/501 |
| 4,210,067 | 7/1980 | Evans, Jr. . |
| 4,570,844 | 2/1986 | Wysocki ..................... 229/16 |
| 5,429,580 | 7/1995 | Diaz . |

*Primary Examiner*—Jack W. Lavinder
*Attorney, Agent, or Firm*—Nixon & Vanderhye P.C.

[57] ABSTRACT

An apparatus for assembling a filter having a peripheral frame and at least one filter media component includes a continuous conveyor for feeding a plurality of filter frames, in succession, to a plurality of workstations, each filter frame having a closed periphery with a generally upstanding leading flap, side flaps and a trailing flap, the workstations including: a) a first station including at least a pair of tools located so as to engage and open the side flaps; b) a second station including a media component supply roll, a cutter adapted to cut a predetermined length of media component; guide elements adapted to guide the cut length of media component for movement away from the cutter; and a reciprocable carriage adapted to receive the cut length of media component, the carriage having a motive drive adapted to accelerate forwardly to a position where the carriage is located directly above an opened filter frame on the conveyor; and forward and rearward flippers adapted to open the leading and trailing flaps and to move the media component from the loader carriage into the filter frame.

14 Claims, 23 Drawing Sheets

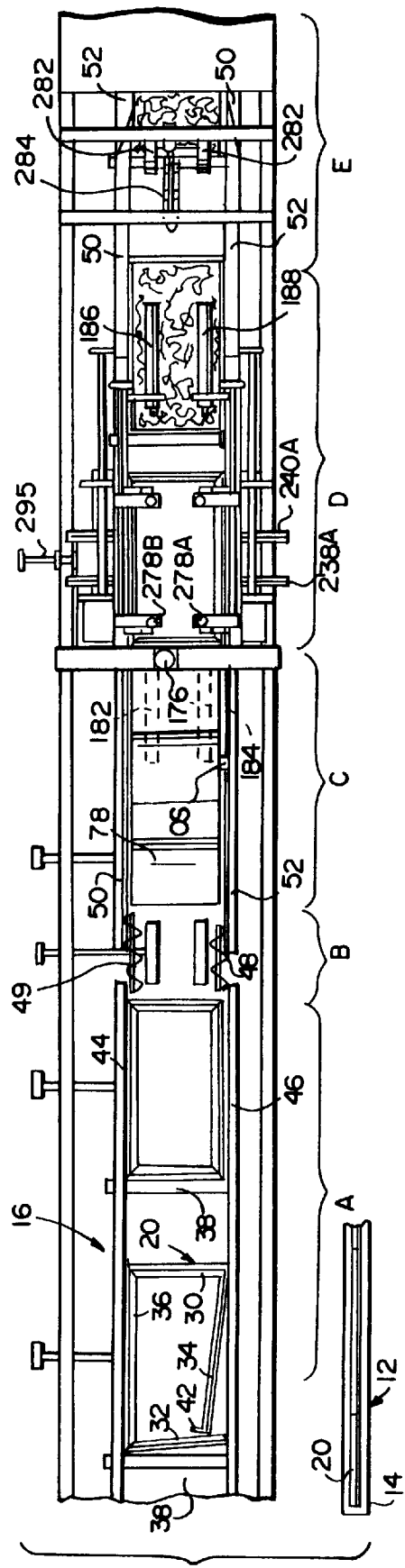

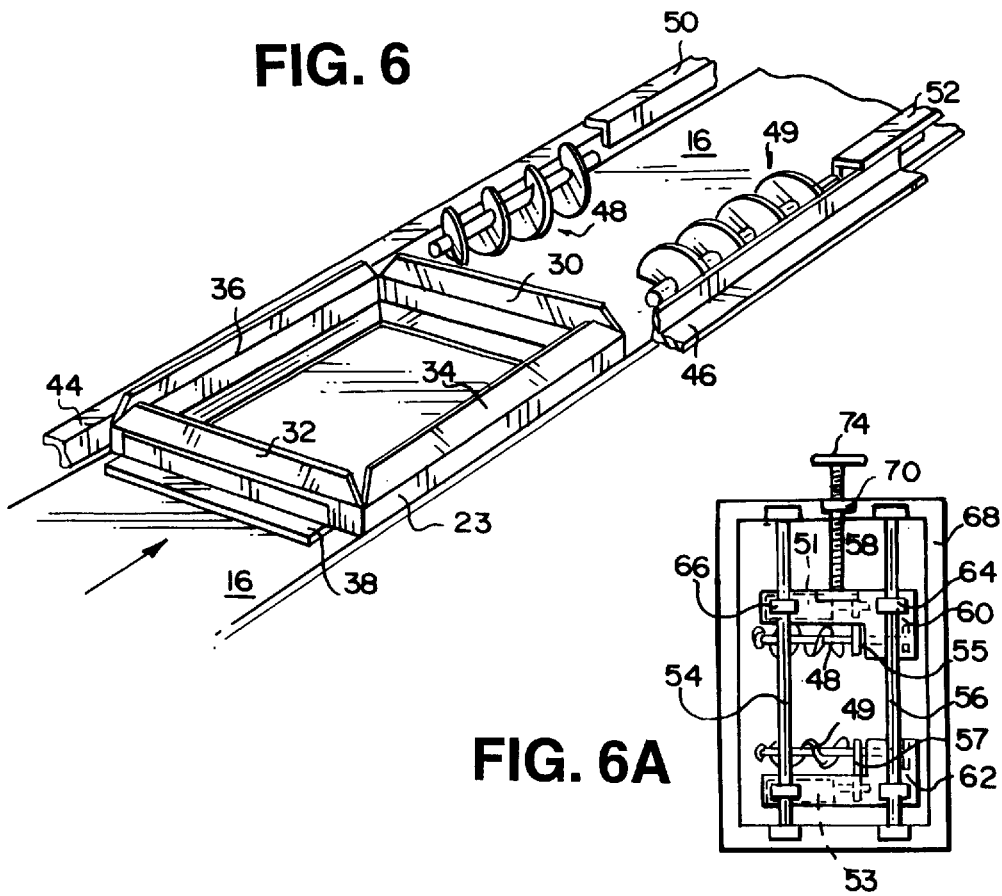
FIG. 6
FIG. 6A
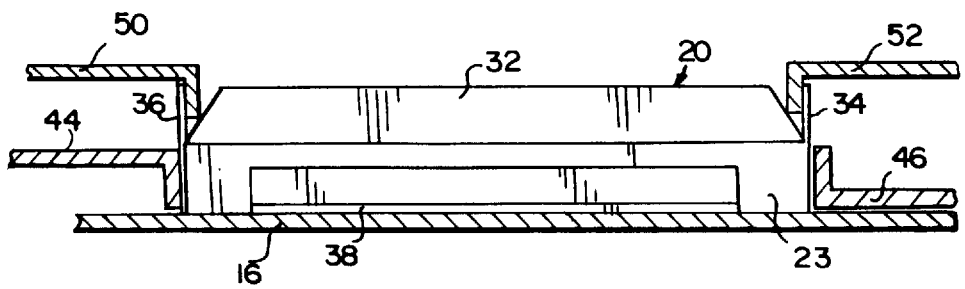
FIG. 7

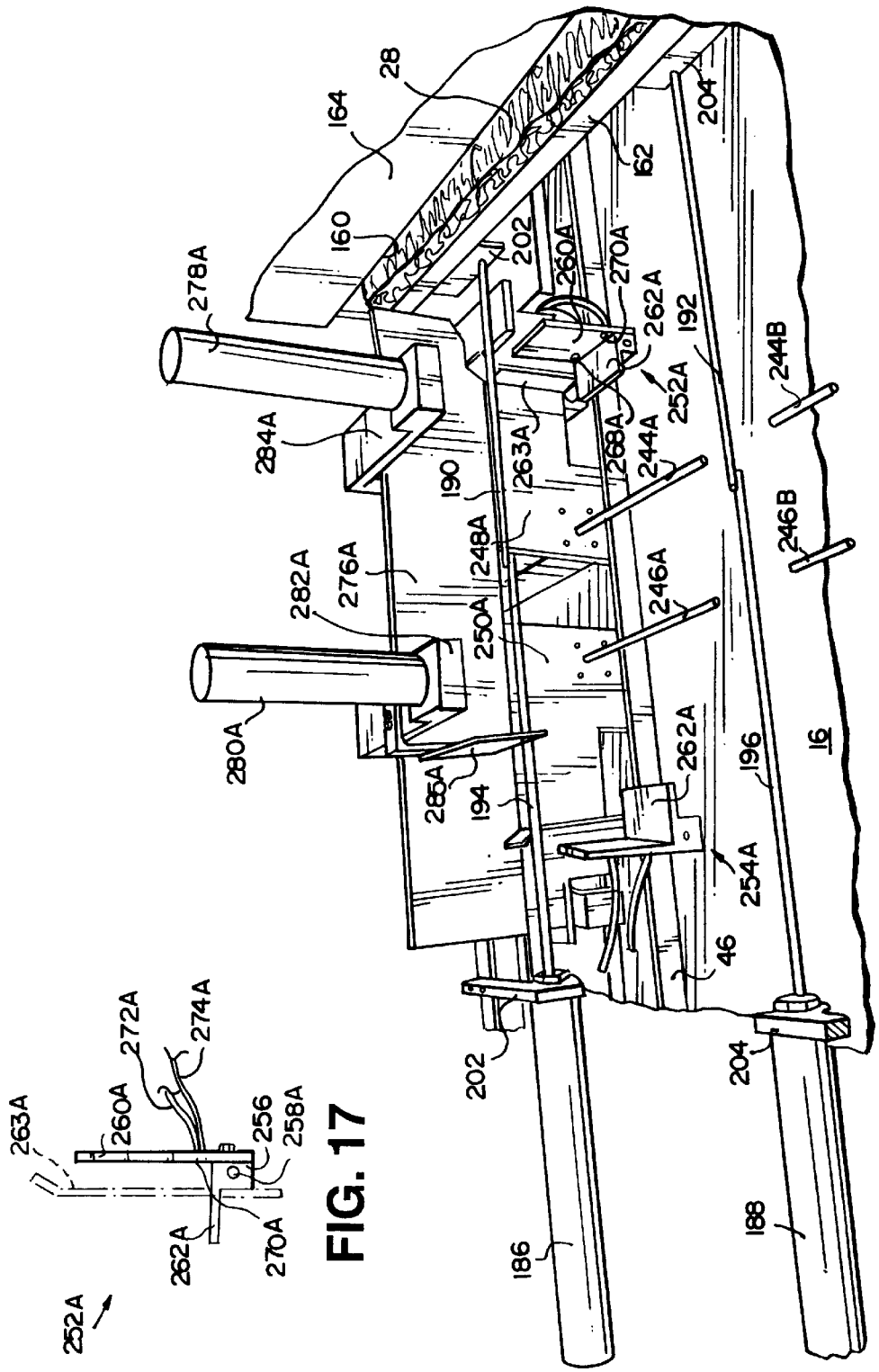

FILTER ASSEMBLY APPARATUS

TECHNICAL FIELD

This invention relates to a filter assembly apparatus and, more specifically, to an apparatus which loads filter media pads into filter frames as the filter frames move linearly along a continuous conveyor.

BACKGROUND AND SUMMARY OF THE INVENTION

Furnace and other similar filter assemblies typically include a square or rectangular chipboard (or heavyweight paper) frame which surrounds and holds in place a filter media pad with or without air flow guide sheets on one or both sides of the filter media pad. Conventional techniques for assembling such filters require considerable manual labor to complete the assembly. Typically, the frame is manually arranged on a conveyor, and a worker then holds the frame flaps open and inserts the filter media pad (and one or more air flow sheets if required) into the frame as the frame moves along a conveyor. After insertion of the media pad into the frame, it is necessary to fold the generally upstanding frame flaps downwardly to a flat position, and to hold the flaps in this position until the filter travels between top and bottom heated plates (or other suitable heating device) to activate pre-applied glue strips on the frame to thereby adhere the frame to the media pad.

In the above process, it is necessary to fold the frame flaps in proper sequence, i.e., the leading and trailing flaps (relative to the direction of movement of the filter assembly on the conveyor) must be folded before the side flaps. Since, however, the flaps typically do not stand up vertically, it is necessary to hold the side flaps open to provide the space necessary to effect folding of the leading and trailing flaps. After the leading and trailing flaps are folded, then the side flaps may be folded and glued to complete the assembly.

In commonly owned U.S. Pat. No. 5,429,580, apparatus is disclosed which automatically separates or opens the side flaps of the filter frame after the filter media pad has been loaded manually into the frame, folds the leading and trailing flaps over the media pad while the filter assembly travels along the conveyor, and then folds the side flaps, thus partially automating the filter assembly process.

The invention here relates to further improvements which, in addition to the features similar to those described in the '580 patent, also include automated components which sequentially feed cut and load media pads into successively presented and continuously moving filter frames.

In accordance with this invention, one piece filter frames are initially folded and placed onto the conveyor manually. An additional feature of this invention is the location of a spot of pressure sensitive adhesive on an inside surface at one end of each frame so that, as the frame is manually reconfigured from a straight strip to a square or rectangular frame, a tab formed on the opposite end of the frame is pressed into overlapping engagement with the end having the adhesive spot. This arrangement holds the frame in its desired square or rectangular shape during the assembly and sealing operation. The frames then successively move along the conveyor toward the filter media pad insertion station. Throughout the assembly process, the filter frames are held in longitudinally spaced relationship on the conveyor by means of transverse pusher bars on the conveyor belt. Stationary side guides located along opposite marginal edges of the belt maintain lateral alignment of the filter frames. As the frames approach the loading station, a pair of rotating augers are used to open the side flaps of the frame. The frame side flaps are then captured behind vertical guides extending substantially the length of the apparatus. The side flaps thus remain open during the media pad loading operation.

In the exemplary embodiment, a supply drum is located and arranged to feed a continuous length of filter media material to a location above the conveyor assembly line on which filter frames travel. A second supply drum may be arranged linearly adjacent the first drum to facilitate continuous operation of the process. Supply drums are also provided for feeding expanded wire sheeting above and/or below the media material in the event air flow guides are to be employed.

A vertically reciprocable shear blade is used to cut the filter media to length, using a pair of pinch rollers driven by a servo motor controlled by a programmable controller for feeding the desired length of material past the blade so as to match the media pad size to the filter frame size. In the exemplary embodiment, two pair of oppositely arranged, axially extendable/retractable rods are used to support the media pad (and expanded wire sheeting, if used) during cutting. For convenience, reference to the filter media pad should be understood as including a sandwich assembly where the media pad has expanded wire on one or both sides thereof. After the media pad is cut, the support rods underlying the media pad are retracted, and the pad falls (or pushed if necessary) downwardly onto transversely oriented supporting rods of a linearly reciprocable loader carriage. The loader carriage is also located above the continuous conveyor on which the filter frames are transported.

After the filter pad is received on the support rods of the loader carriage, the latter is accelerated up to the speed of the conveyor. As movement of the carriage is commenced, the transverse support rods are retracted to allow the pad to drop into the frame. At the same time, pivoting flippers on the carriage open the front and back flaps of the frame so that the pad is free to fall into the frame. The flippers incorporate air lines which direct a blast of air onto the pad to assist and to insure proper insertion of the pad within the frame. The flippers are then retracted and, when the loader carriage reaches the end of its forward travel, it is reversed and travels back to its home position for pick-up of the next succeeding filter media pad.

The loaded filter frame/media pad assembly is then further processed along the conveyor so as to fold the front, back and side flaps of the frame over the now enclosed filter media pad, and to seal the frame, e.g., as described in U.S. Pat. No. 5,429,580, but with certain differences as noted further herein.

It is also a feature of this invention that the apparatus can be adjusted to assemble filter frames of different lengths and widths. This is achieved by making the various components on one side of the apparatus laterally adjustable relative to stationary components on the opposite side, while certain components are also longitudinally adjustable. In addition, the longitudinal spacing between frame pusher bars on the conveyor is sufficient that frames of various lengths can be accommodated without having to adjust the pusher bar spacing.

In one aspect, the present invention thus provides a method of assembling a filter having a peripheral frame and a filter media pad comprising the steps of:

a) feeding a frame continuously along a conveyor;

b) feeding a continuous length of sheet material above the frame;

c) cutting the sheet material to a predetermined length adapted to fit within the frame; and d) inserting the cut sheet into the frame during continuous movement of the frame.

In another aspect, the invention provides a method of assembling a filter frame and filter media pad comprising the steps of:

a) continuously feeding a plurality of filter frames in a first direction;

b) supplying filter media material to a first station where the pad is cut to a predetermined size thereby forming a media pad;

c) providing a reciprocable carriage adapted to receive the media pad at a first location and moving the carriage to a second location above one of the frames on the conveyor;

d) inserting the media pad into the frame while the frame continues to move in the first direction; and e) returning the carriage to the first location for pick-up of another filter media pad.

In still another aspect, the invention provides a method of assembling a filter media pad and a peripheral frame comprising the steps of:

a) feeding a plurality of peripheral frames in a first direction on a continuously moving conveyor;

b) feeding filter media material in the first direction above the frame to a first station;

c) cutting the filter media material to a predetermined length to thereby form a filter media pad sized to fit within the frame, while the predetermined length is supported by a first set of retractable, underlying support elements;

d) retracting the first set of support elements, permitting the pad to fall onto a reciprocable carriage, said carriage supporting the pad by a second set of retractable support elements;

e) moving the carriage in the first direction to a location vertically above one of the frames while retracting the second set of support elements and inserting the pad into the frame; and f) returning the carriage to the first station.

In another aspect, the invention relates to apparatus for assembling a filter having a peripheral frame and at least one filter media component, the apparatus comprising a continuous conveyor for feeding a plurality of filter frames, in succession, to a plurality of workstations, each filter frame having a closed periphery with a generally upstanding leading flap, side flaps and a trailing flap, the workstations including:

a) a first station including at least a pair of tools located so as to engage and open the side flaps; and b) a second station including a media component supply roll, a cutter adapted to cut a predetermined length of media component; guide elements adapted to guide the media component for movement away from the cutter; and a reciprocable carriage adapted to receive the cut length of media component, the carriage having a motive drive adapted to accelerate forwardly to a position where the carriage is located directly above an opened filter frame on the conveyor; and forward and rearward flippers adapted to move the media component from the loader carriage into the filter frame.

The apparatus and method in accordance with this invention result in significant productivity increases with substantially less manual labor, which in turn results in decreased costs.

Other objects and advantages of the invention will become apparent from the detailed description which follows.

BRIEF DESCRIPTION OF THE DRAWINGS

FIG. 1 is a schematic plan view of apparatus in accordance with an exemplary embodiment of the invention;

FIG. 2 is a plan view of a conventional furnace filter;

FIG. 3 is a perspective view of a conventional furnace filter with side flaps of the filter frame in a partially open position;

FIG. 6 is a partial perspective view of the initial processing stage of the present invention, where the filter frame side flaps are open prior to insertion of the filter media pad;

FIG. 6A is a plan view of the augers used to open the side flaps of the filter frame;

FIG. 7 is an end elevation, partly in section, taken along line 7—7 of FIG. 6;

FIG. 16 is a simplified partial perspective illustrating the filter media loading station and reciprocable carriage in accordance with the exemplary embodiment of the invention;

FIG. 17 is a side elevation of a flipper device of the type used in FIG. 16;

BEST MODE FOR CARRYING OUT THE INVENTION

Referring now to FIG. 1, the apparatus 10 of this invention may include a frame supply conveyor 12 terminating at 14. A second conveyor 16 runs generally parallel to the first conveyor and includes several work stations in accordance with this invention. At a first station A, elongated filter frames which have been cut and/or scored at the appropriate locations, are manually removed from the infeed frame conveyor 12, folded, and then placed onto the conveyor 16. The frames are then processed through a frame preparation station B, a media feeding and cutting station C, a media loading area D, and a frame closing and sealing station E.

Figure 4:
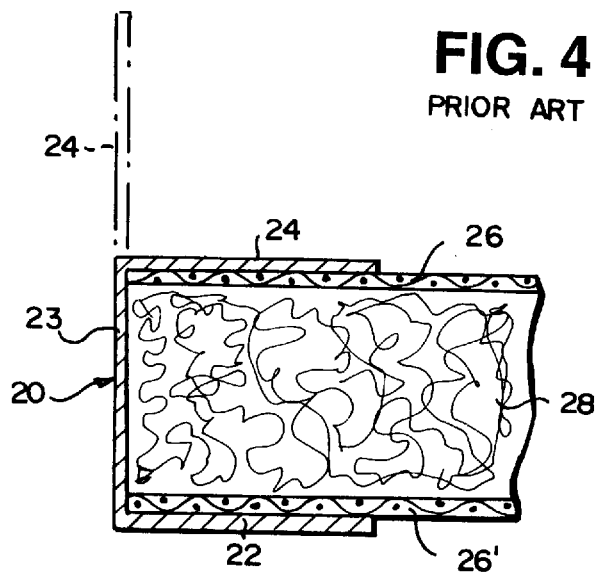
FIG. 4 is a partial section through a conventional furnace filter.
Figure 5:
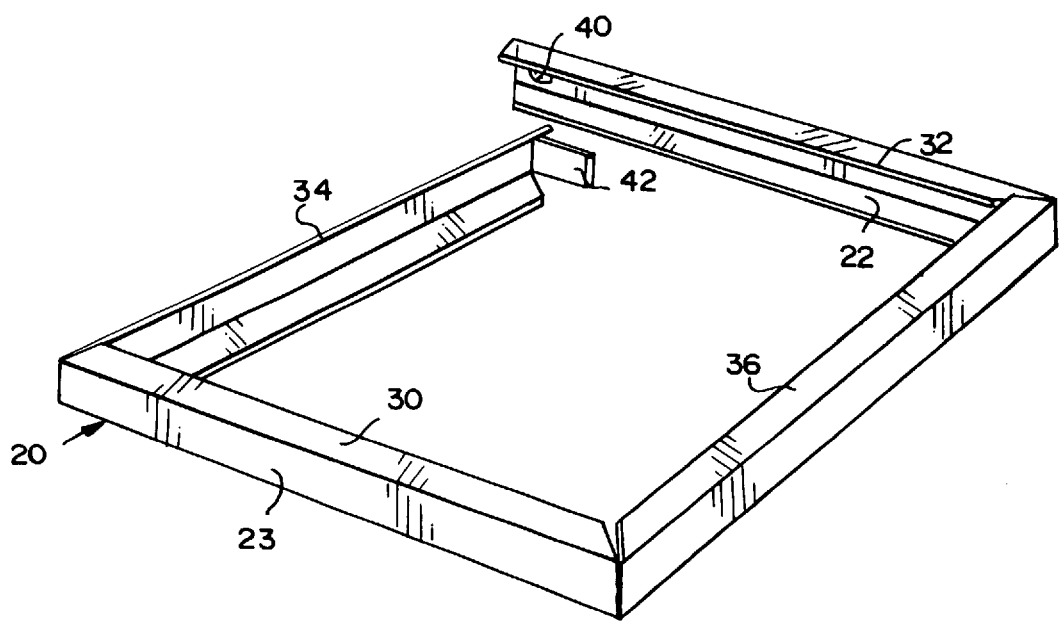
FIG. 5 is a perspective view of a filter frame in accordance with the present invention, without a filter media pad, and illustrating a fastening arrangement at one corner of the frame.

Prior to describing the apparatus 10 in detail, it will be helpful to understand the construction of the filter assembly per se, as well as the necessary folding sequence of the flaps of the filter frame about the enclosed filter media pad. As shown in FIG. 2, each filter assembly 18 includes a pre-cut and folded chipboard frame 20, which is generally square or rectangular in shape in its final configuration. With reference to FIG. 4, it will be appreciated that the frame is essentially a squared C-shape in cross section, such that an underlying horizontal flange 22 extends inwardly from the bottom of a vertical peripheral rim 23, and an upper horizontal flange 24 (formed by front, side and rear flaps) extends inwardly from the top of the rim 23. Upon initial processing, and as described in greater detail below, the upper flap elements which comprise the upper flange must be opened to about the same or greater extent than to the position shown in phantom in FIG. 4. This is done at station B and allows insertion at stations C and D of a first flow guide sheet 26, a filter media pad 28, and a second flow guide sheet 26' (as in conventional filter constructions with the understanding that the flow guide sheets are optional) supported on the lower flange 22. The filter media pad material 28 may be expanded fiberglass or other suitable material, while the optional flow guide material 26, 26' may comprise expanded wire sheeting or other suitable material. The expanded wire (shown) or other material 26 may have air flow guide and/or media pad reinforcement functions, depending on the specific properties and configuration of such material. Typical filter sizes include 10 to 24 inch widths and 12 to 30 inch lengths.

To secure the expanded wire (or wire sheets) as well as the pad 28 within the frame 20, the upper flaps of the frame must be folded in proper sequence, downwardly and inwardly to a horizontal orientation and then glued in place. Specifically, the forward or leading flap 30 and rearward or trailing flap 32 must be folded substantially parallel to the media pad 28 and, if present, the wire sheets 26 and 26', before the side flaps 34, 36 are folded. After the flaps are folded to a substantially horizontal position, they are secured in place by adhesive activated by passing the assembly through a heating device (e.g., between a pair of hot plates, or oven, etc.) at station E.

Initially, at the terminal end 14 of infeed frame conveyor 12, a spot 40 of pressure sensitive adhesive is placed on the interior of wall 23 at one end of the frame so that, when the frame is manually folded in place between successive push bars 38, a tab 42 on the frame flap 34 is pressed into place against the adhesive spot 40, thus insuring that the frame 20 remains in its folded rectangular or square shape during processing through the various stations as described below. It should be understood that other fastening means may also be employed.

In accordance with this invention, the filter assembly process is wholly automated following manual placement of the folded frames 20 onto the conveyor 16. More specifically, the above described folded frames 20 are placed one behind the other on the conveyor 16 between adjacent, longitudinally spaced push bars 38. Elongated, stationary lower side guides 44 and 46 hold the frames in the desired lateral alignment. Thus, each frame 20 is located longitudinally and laterally on the conveyor 16.

It will be appreciated that the process described herein is a continuous one, with filter frames 20 placed onto the conveyor 16, one after the other during continuous advancement of the conveyor. For simplicity, the description below tracks the progress of one such filter frame 20 through the various stations of the apparatus 10.

With reference now also to FIGS. 6, 6A and 7, after loading the frame 20 onto the conveyor 16 at station A, the frame 20 is engaged at station B by a pair of rotating augers 48, 49 arranged so that their axes of rotation extend parallel to the direction of movement of the filter frames and, hence, parallel to the filter frame sides. The augers engage the side flaps 34, 36 and force them outwardly to an open position, causing the side flaps to be trapped behind upper side edge guides 50, 52 (FIG. 7) which extend substantially the length of the apparatus, parallel to the marginal side edges of the conveyor 16, adjacent and above the lower edge guides 44, 46.

The augers 48, 49 may be constructed and generally arranged substantially as disclosed in U.S. Pat. No. 5,429,580, incorporated herein by reference. In fact, as compared to the disclosure in the '580 patent, the augers disclosed therein have simply been moved upstream to the location shown herein, prior to insertion of the filter media pad at stations C and D.

The "axial" speed of the flights of the augers 48, 49 exceeds the speed of the conveyor 16 so that the first flight simply skips over the forward flap 30 of the frame 20, and thus does not push the front flap down to otherwise interfere with the opening of the side flaps 34, 36 by the tangential engagement of the flights with the side flaps. One of the auger assemblies (e.g., 48) is also laterally adjustable toward or away from the other auger 49 to accommodate filter frames of different widths. Thus, the auger assembly 48 is mounted for movement along transverse support rods or rails 54, 56 (FIG. 6A) by means of a screw adjustment rod 58. More specifically, the auger assemblies 48 and 50 are mounted on support brackets 60, 62, respectively, with the bracket 60 slidably mounted on the support rods 54, 56, by means of linear bearings 64, 66. At the same time, the adjustment screw 58 is secured to a stationary machine support frame 68 by means of a threaded bearing 70. The free end of the adjustment screw 58 is captured within a bearing block 72 fixed to the bracket 60. It will be appreciated that rotation of the adjustment screw 58 via hand wheel 74 will result in movement of the auger assembly 48 toward or away from the auger assembly 50, depending on the width of the frame 20. The augers 48, 49 are driven by motors 51, 53 via belts 55, 57. It will be understood that upper and lower guide rails 44 and 50 may be similarly laterally adjustable relative to rails 46 and 52.

With the filter frame 20 now approaching station C, the media feed and cut apparatus come into play. With reference to both FIGS. 1 and 8, a media pad supply roll assembly 76 is mounted above the conveyor 16 and is arranged to feed in the direction of movement of the conveyor.

The assembly includes a pair of media material drums 78, 80 located above the conveyor. The drums 78, 80 are freely rotatable since the feeding of the media pad material is effected by the pinch rollers 82, 84 located downstream of the assembly 76.

Figure 8:
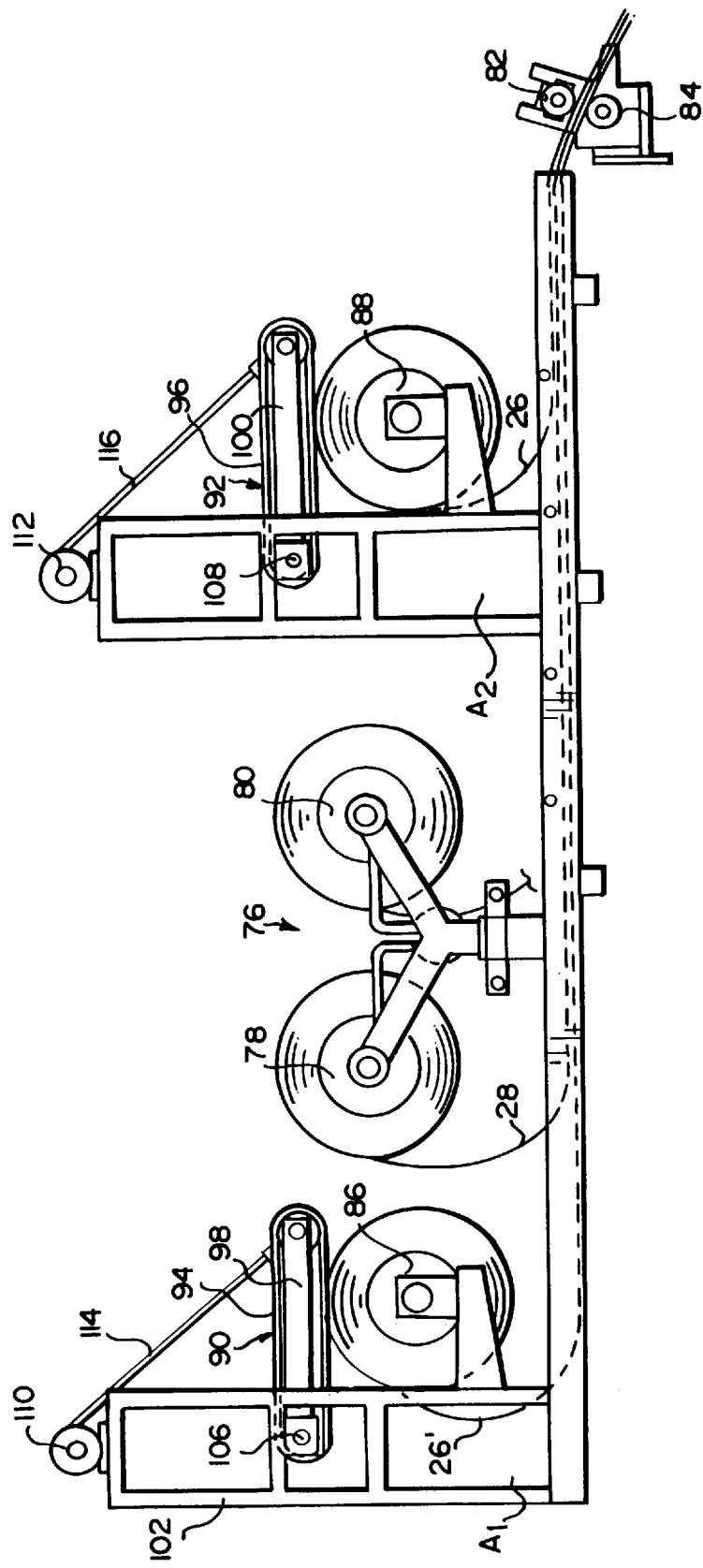
FIG. 8 is a partial side elevation illustrating the filter media pad and air flow guide supply drums in accordance with an exemplary embodiment of the invention.

Also shown in FIG. 8 (but not shown in FIG. 1) are a pair of expanded wire supply drums 86, 88 which, if desired, are used to locate expanded wire sheeting 26 and/or 26' above and/or below the filter media material 28. Each drum 86, 88 has an associated belt drive 90, 92, respectively, and motor (not shown). The belt drives include closed loop belts 94, 96 which are mounted on supports 98, 100 pivotally mounted to stationary frames 102, 104 via pivot pins 106, 108. The belt drives are permitted to rest on their respective drums by their own weight and, upon actuation of their drive motors, the belts pay out predetermined lengths of expanded wire sheeting to storage areas $A_1$, $A_2$ behind and below the drums 86, 88. This paid out wire is then available to be pulled along with the filter media material by the pinch rollers 82, 84. Winch mechanisms 110, 112 and respective cables 114, 116 are utilized to move the belt drives 90, 92, respectively to non-drive positions as desired (as, for example, when changing drums). By paying out the expanded wire in advance, no tension is placed on the expanded wire still wound on the drum. Because the filter media material 28 and one or more layers of expanded wire 26, 26' are fed as a single entity, reference will be made herein to only the filter media material for simplicity sake, with the understanding that material 26 may have underlying and/or overlying layers of sheeting 26, 26'.

Figure 9:
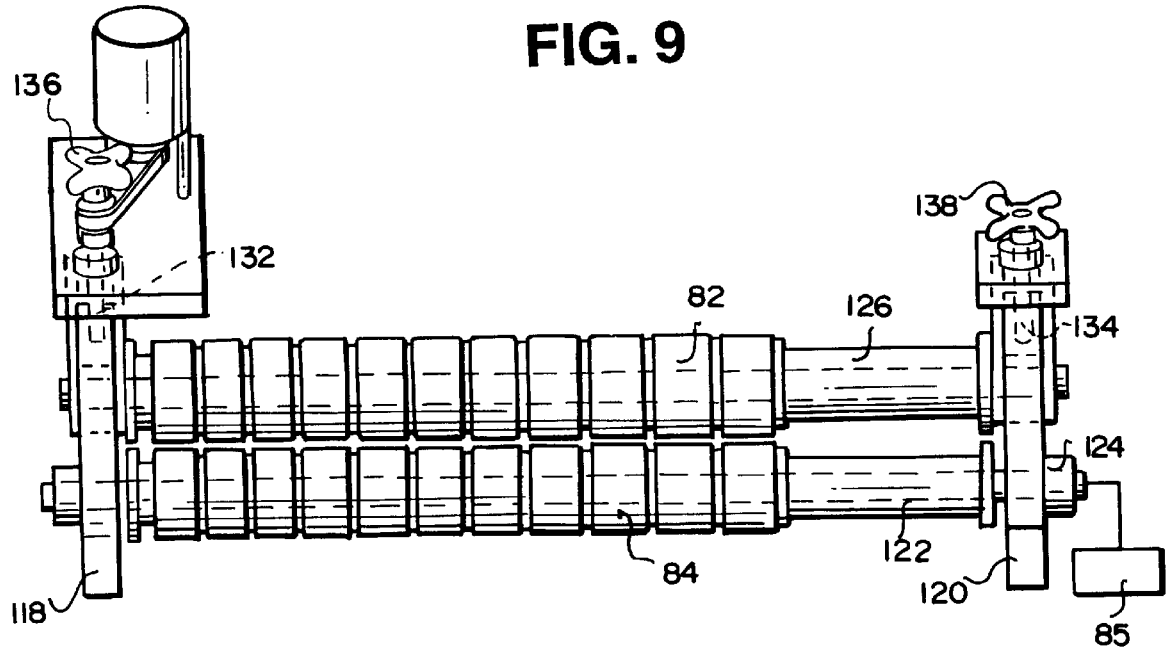
FIG. 9 is a rear elevation of a pair of pinch rolls used to feed the filter media pad to a cutting station in accordance with an exemplary embodiment of the invention.
Figure 10:
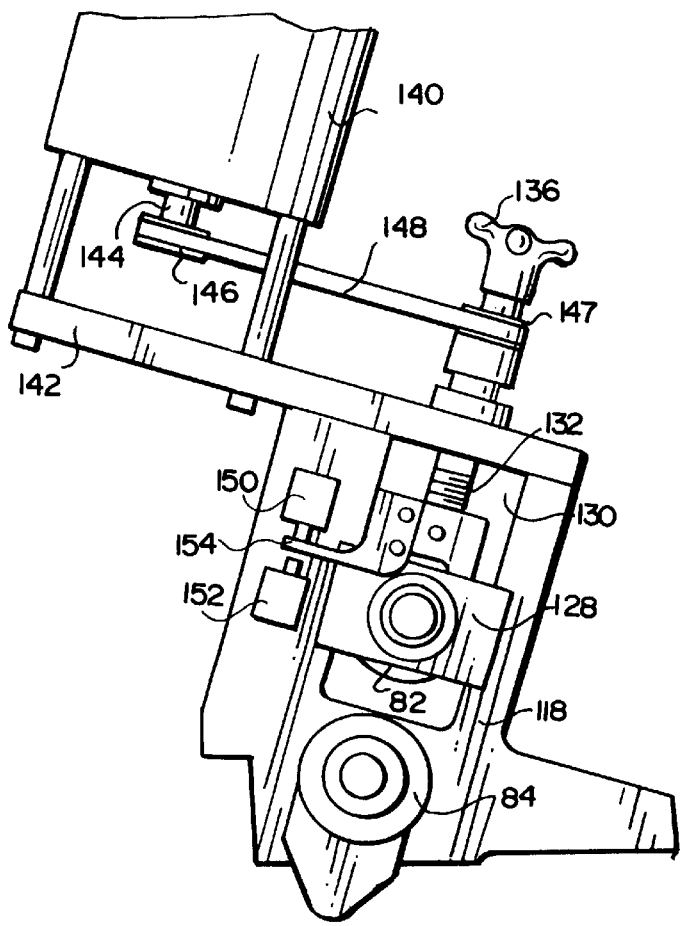
FIG. 10 is a partial side elevation illustrating an automatic adjustment mechanism for the pinch rolls shown in FIG. 9.

Turning now to FIGS. 9 and 10, the pinch rollers 82, 84 are mounted within stationary machine frame components 118, 120 at opposite ends of the rollers. Roller 84 is mounted for rotation on an axle 122 supported by the machine frame components 118, 120 by suitable bearings 124. Roller 84 is driven by a servo motor 85, while roller 82 is driven by friction. The upper pinch roller 82 is similarly mounted on an axle 126 but the roller 82 is mounted for adjustment toward and away from the pinch roller 84 as further described below. Specifically, the pinch roller 82 is fixed to a movable block 128 which is slidable along an opening 130 in the machine frame components 118 and 120 by reason of adjustment screws 132, 134 and respective hand wheels 136, 138. It will be appreciated that by turning the adjustment screws 132, 134, the pinch roller 82 will move toward or away from the pinch roller 84. A coil spring may be used to bias roller 82 away from roller 84 and against gap closing rotation of screw 134. The other screw 132 has an automatic adjustment mechanism described below.

It is also a feature of this invention to have an automatic direction compensation mechanism which insures that the filter pad material 28 will be fed in a precise forward or longitudinal direction so that the material remains aligned with the filter frames 20 traveling below on the conveyor 16. This adjustment mechanism includes a motor 140 fixed to a bracket 142 on the machine component 118, the motor having an output shaft 144 and associated drive wheel 146. The drive wheel 146 is operatively connected to a toothed wheel 147 on the adjustment screw 132 by means of a cogged belt 148. While the pinch rollers 82, 84 are initially adjusted to provide a predetermined gap or nip therebetween which will insure immediate and precise feeding of the filter pad material 28, more or less pressure at one end of the nip (on the lefthand side as shown in FIG. 9) will also result in a lateral direction of movement change of the filter media material 28. In the present invention, an optical sensor OS (FIG. 1) is mounted at the upstream side of the pinch rollers 82, 84, along the longitudinal edge of the filter pad material 28 closest to the adjustment motor 140. The arrangement is such that if the optical sensor does not "see" the edge of the filter media material 28, the motor 140 will be activated to rotate the adjustment screw 132 to apply additional force on the lefthand side (see FIG. 9) of the pinch roller pair 82, 84, to thereby bring the filter pad material 26 toward the sensor.

This increased force action continues until the optical sensor "sees" the edge of the filter pad material 28. At that time, the motor 140 reverses its direction of movement so that the adjustment screw 132 increases the gap between the pinch roller 82 and the lower roller 84, so that the filter pad material 26 begins to move laterally toward the opposite ends of the pinch rollers 82, 84. However, as already noted, as soon as the edge moves away from the optical sensor, the motor 140 is again reversed to decrease the nip thereby bringing the filter pad material back toward the lefthand side again as viewed in FIG. 9. This adjustment action is conducted on a continuous basis so that the filter pad material 28 is always precisely aligned as it is fed toward the cutter and ultimately, to the filter frame insertion station. With reference again to FIG. 10, it will be seen that a pair of stops 150 and 152 in combination with a tab 154 fixed to the movable support 128, serve as limit stops for the amount of adjustment permitted for the upper pinch roller 82.

With reference again to FIG. 9, the pinch rollers 82, 84 may be constructed of, or include sleeves constructed of hard rubber (e.g., neoprene) or other friction enhancing material, and may be formed with a series of raised rings 156.

Pinch rollers 82 and 84 are driven by a servo motor (not shown), with the motor programmed to provide a precise length of material beyond the shear cutting blade (described below) so that the material cut from the continuous sheet of filter pad material has a length matched precisely to the length of the filter frame 20.

Figure 11:
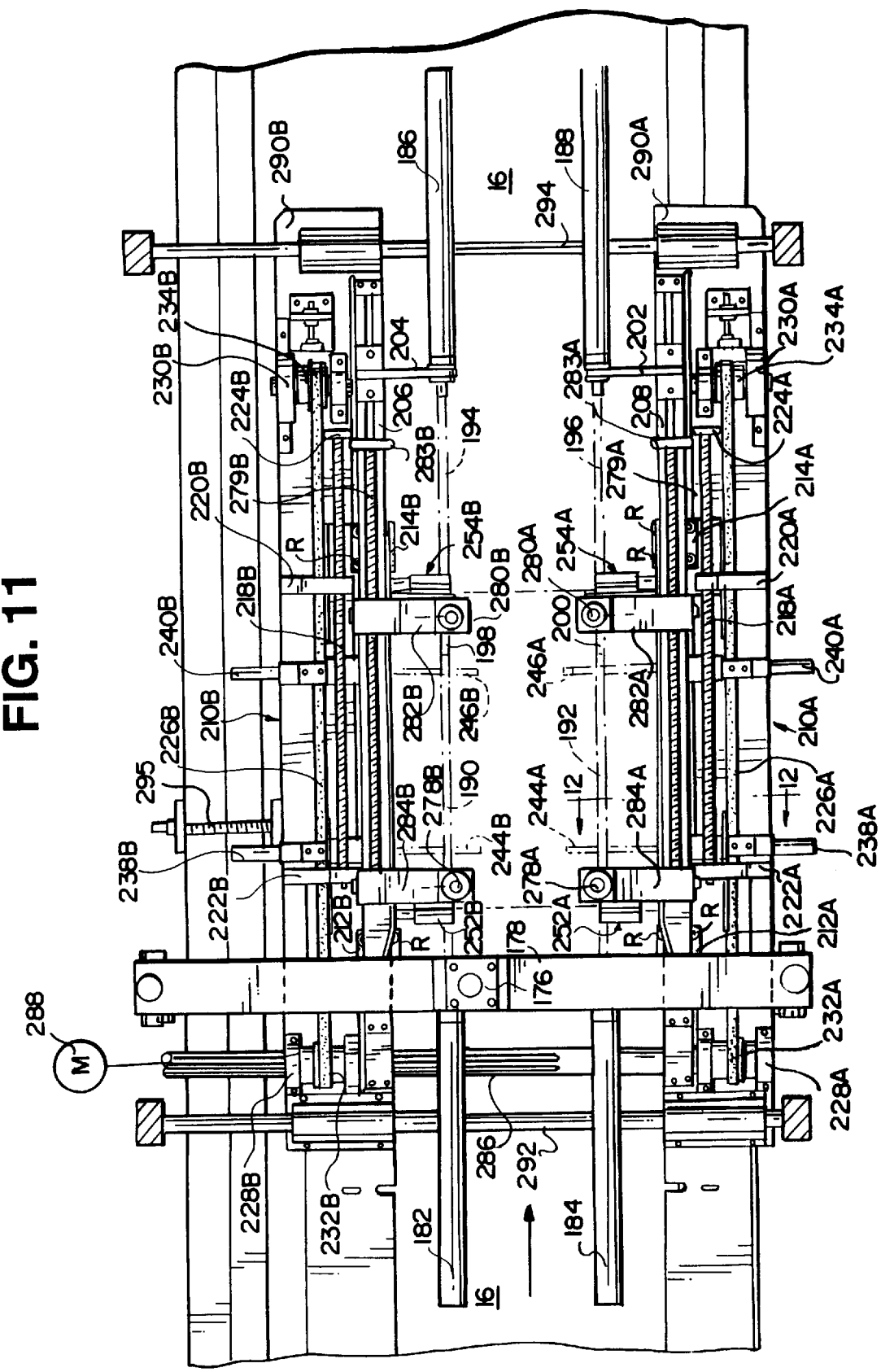
FIG. 11 is a partial plan view, illustrating the filter media loading station and reciprocable carriage in accordance with an exemplary embodiment of the invention.
Figure 12:
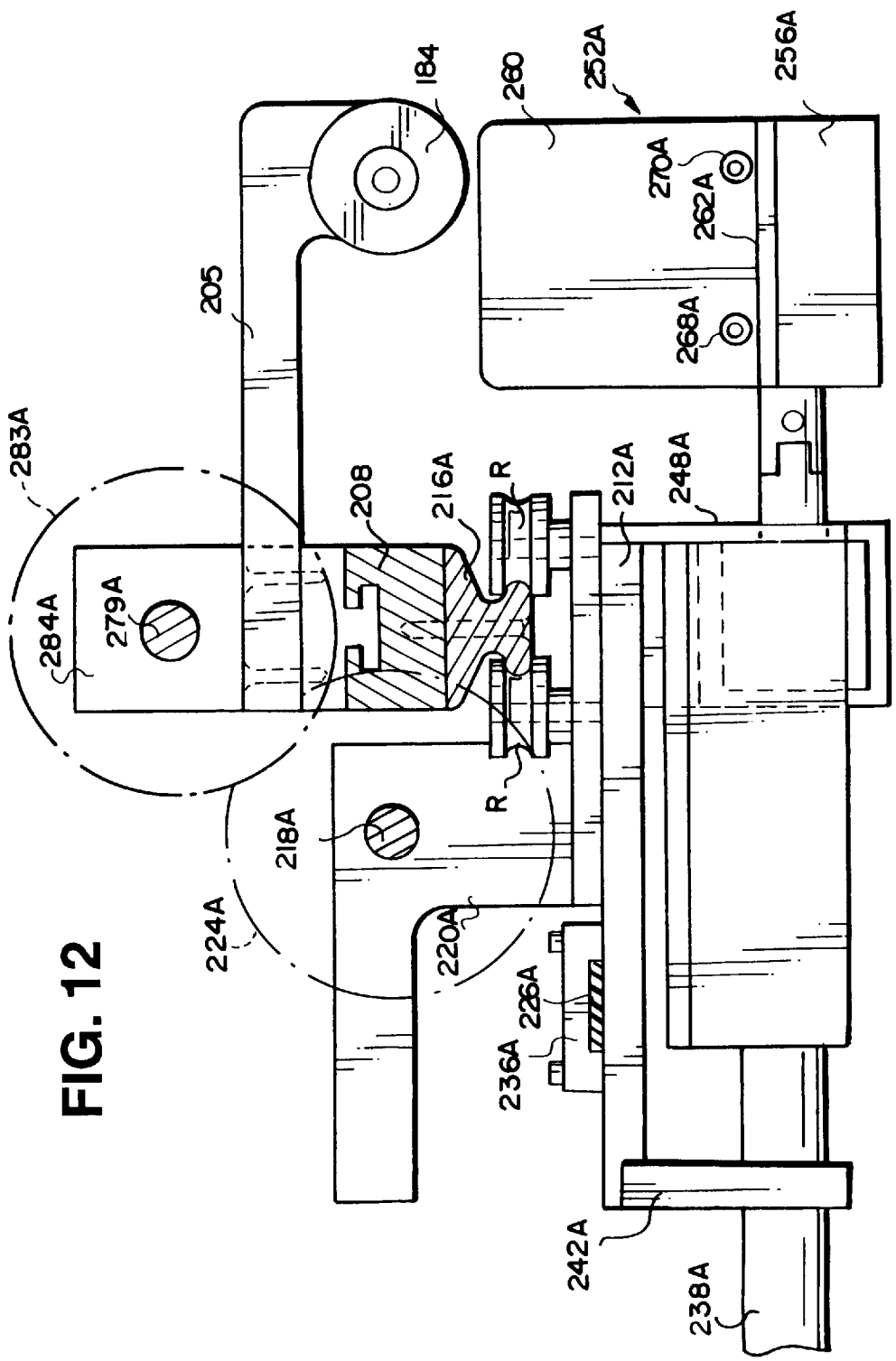
FIG. 12 is a partial section along the line 12—12 of FIG. 11.
Figure 13:
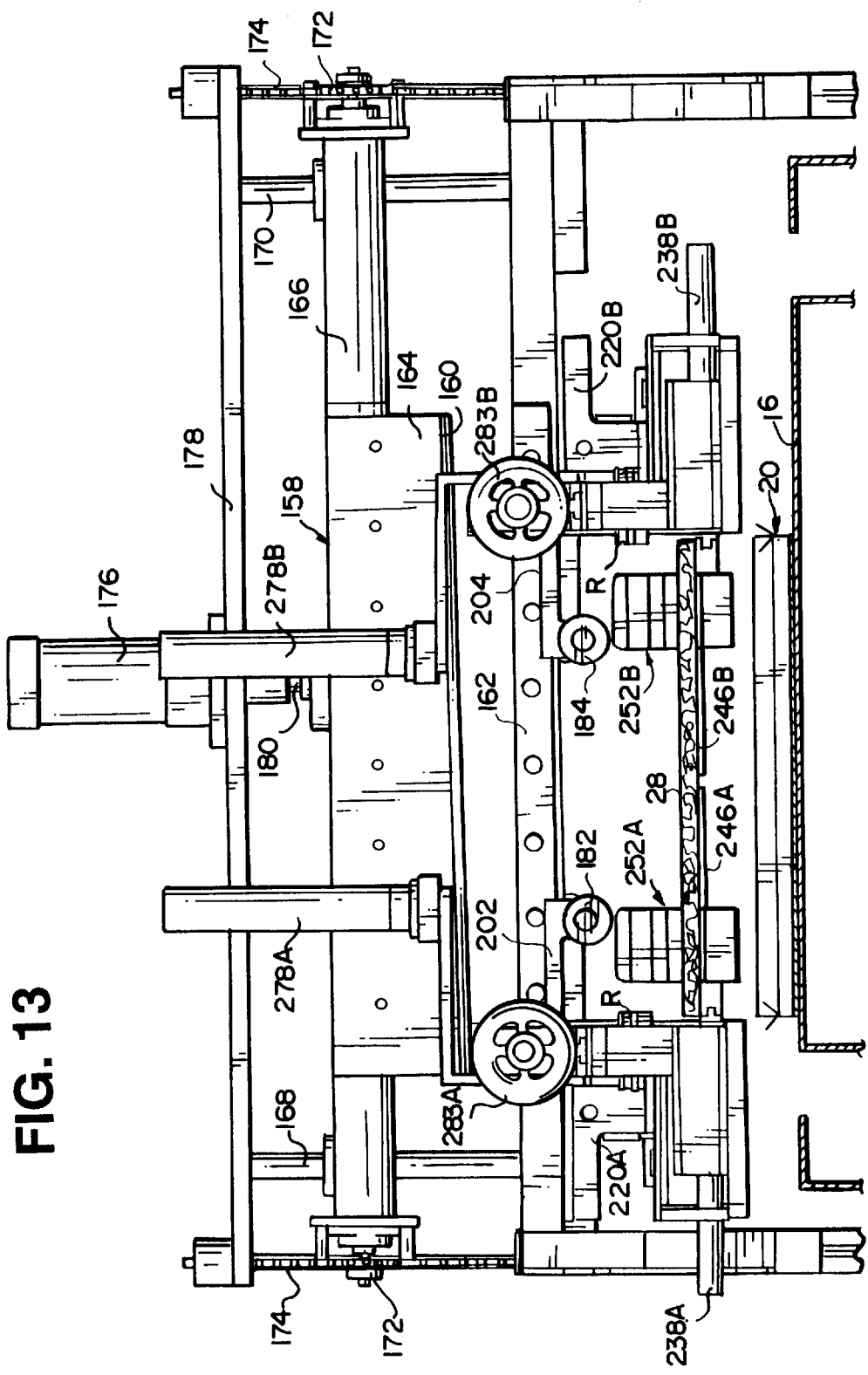
FIG. 13 is a simplified end view taken along the line 13—13 of FIG. 11, with some component parts removed for ease of understanding.
Figure 14:
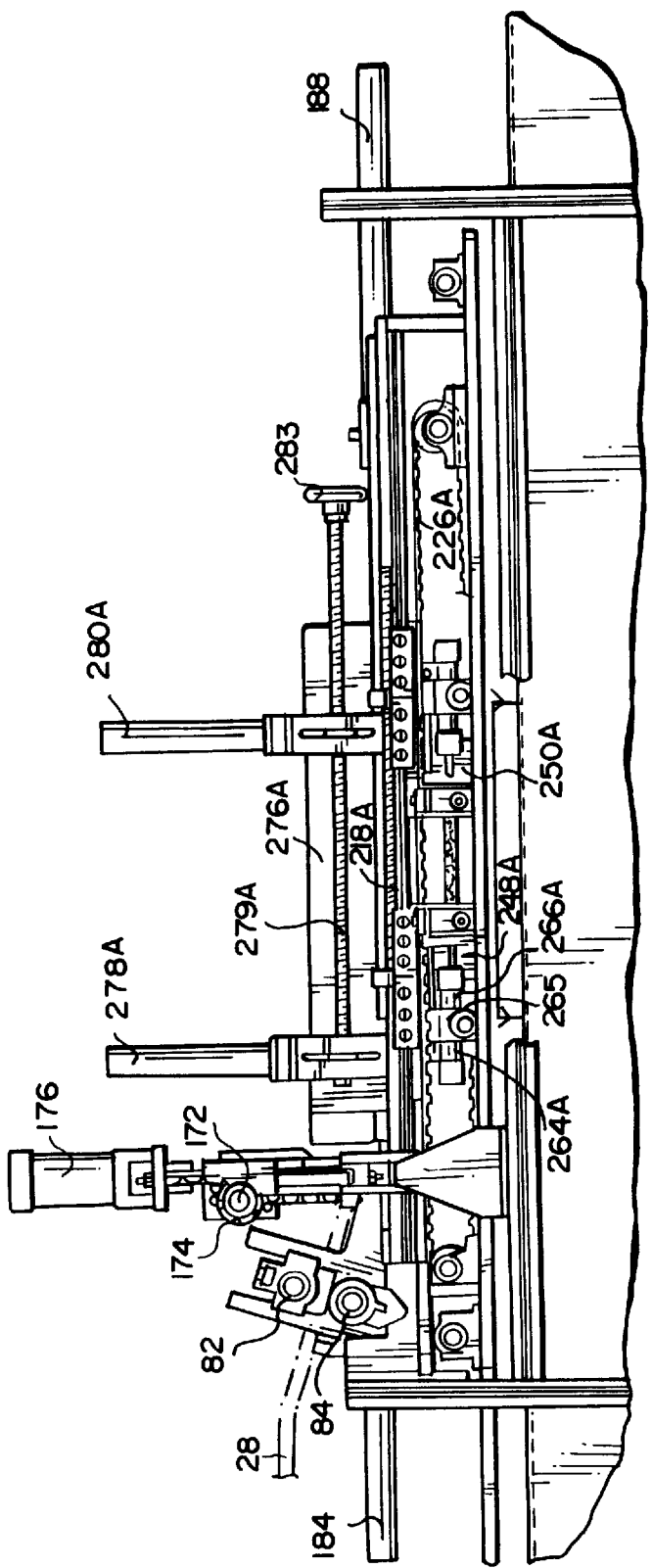
FIG. 14 is a side elevation of the station illustrated in FIG. 11.
Figure 15:
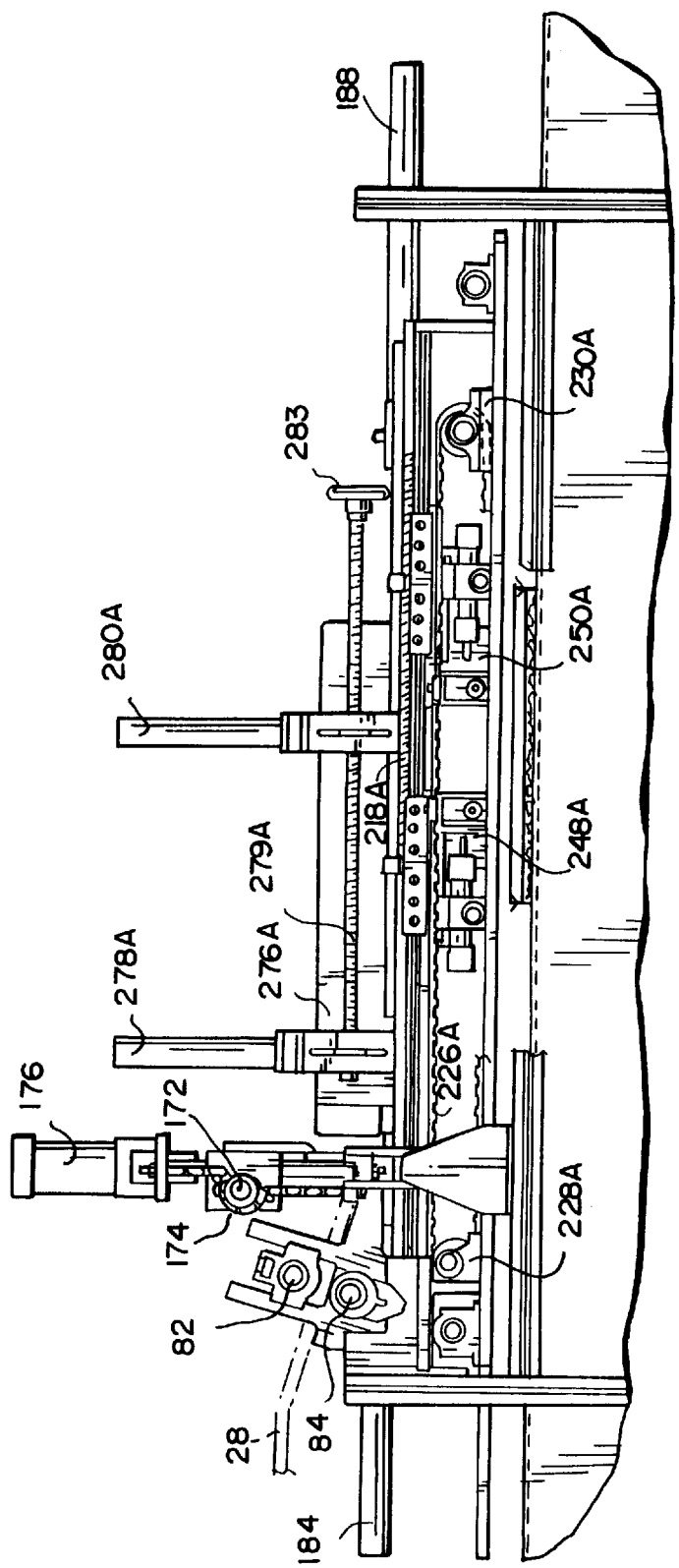
FIG. 15 is a side elevation similar to FIG. 14, but with the reciprocable carriage at a downstream location.

Turning now to FIGS. 11–15, a pneumatic cylinder driven shear cutter assembly 158 (best seen in FIG. 13) is located downstream of the pinch rollers 82, 84 and includes a reciprocable shear blade 160 cooperating with a fixed blade 162. The blade 160 and its support 164 are mounted on a cross beam 166 which is vertically reciprocable on fixed columns 168, 170 which are in turn secured to the machine frame. The cutter 158 is also guided in its vertical reciprocating movement through the use of a gear wheel 172 and chain 174 fixed at opposite free ends of the support 166, as best seen in FIGS. 13, 14 and 15. Upper and lower ends of the chains 174 are fixed to the machine frame components. The cutter mechanism 158 is actuated by the pneumatic cylinder 176 mounted on a cross frame 178, with the piston component 180 secured to the reciprocable support 166.

It will be appreciated that upon feeding of a precise length of filter pad material 28 by the pinch rollers 82, 84, the cylinder 176 is actuated to drive the shear blade 160 vertically downwardly to cooperate with the fixed shear blade 162 so as to cut the precise length of filter media material 28 from the continuous web as further described below.

Because of the nature and construction of the filter media loading mechanism described further below, it is necessary to have retractable supports which support the filter media pad ("pad" simply refers to a cut length of the material 28 and is referenced by the same member) during the cutting operation. To this end, the present invention utilizes two pair of piston cylinder devices 182, 184 and 186, 188, best seen in FIG. 11. As illustrated, the one pair of cylinders 182, 184 is located or arranged in opposed facing relationship with the second pair of cylinders 186, 188, and are located directly above the conveyor 116, lying parallel to the longitudinal axis of the conveyor, and just below the level of the interaction between the shear blade 160 and fixed blade 162. When actuated, retractable piston rods 190, 192 and 194, 196 extend toward each other to a point where the rods partially overlap corresponding opposed rods at locations 198, 200 (see especially FIG. 16) in slightly overlapped relationship. These retractable rods provide underlying support for the filter media material 28 during and immediately after the cutting operation, and they are retracted almost immediately after the cutting operation is completed so as to allow the precisely cut filter media pad 28 to be transferred to an underlying reciprocable carriage as described below. Cylinders 186 and 188 are supported by braces 202, 204, respectively, extending transversely from fixed frame beams 206, 208. Cylinders 182, 184 are similarly supported (cylinder 184 shown in FIG. 12, supported by brace 205). These cylinders have pistons of sufficient length and are so located that they can accommodate filter frames of various lengths without longitudinal adjustment of one pair relative to the other. As a practical matter, cylinders 186, 188 are functional only when the filter media pads exceed the extended lengths of the piston rods 190, 192 of the cylinders 182, 184.

The reciprocable carriage 210 is located above the conveyor 16, with a home position adjacent the cutter 158. The carriage 210 is, in effect, two half carriages 210A and 210B, one on one side of the longitudinally extending conveyor 16, and the other on the opposite side of the conveyor. As described in detail below, the two half carriages are driven by a common drive so that, for all practical purposes, it may be regarded as a single carriage. In this regard, the carriage half section 210A is substantially identical to the carriage half section 210B. The reason for not tying the two half carriage sections 210A, 210B rigidly together in the transverse direction is so that one of the half carriages can be adjusted laterally with respect to the other half carriage to accommodate filter frames 20 of different widths. The manner in which the adjustment is effected will be described below, but it is otherwise sufficient to describe in detail the construction of only one of the carriage half sections, i.e., 210A. Nevertheless, counterpart elements in half section 210B are indicated by similar reference numerals with the suffix "B" added, and which are mentioned below where appropriate. Also, for ease of understanding, reference may be made to the "A side" or "B side" of the machine as necessary.

With specific reference to FIGS. 11 and 12, the half carriage 210A includes front and rear carriage support plates 214A and 212A which are slidable along a fixed track 216A supported on and below the stationary frame beam 208. The support plates 212A and 214A are connected by a longitudinally extending adjustment screw 218A. As best seen in FIG. 11, the screw 218A is threaded through an upstanding bracket 220A of the front plate 214A and is freely rotatable, but longitudinally captured within a similar bracket 222A of the rear 212A. In this way, by rotating the screw 218A via hand wheel 224A, the front plate 214A may be adjusted longitudinally with respect to the rear plate 212A to accommodate filter frames of different lengths. Similar adjustments can be made with respect to carriage section 210B via screw 218B.

The carriage half section 210A is movable longitudinally along the track 216A by means of roller sets (two pair of rollers R are mounted on each plate 212A, 214A), but it will be appreciated that the rollers may be replaced by non-rotating low friction surfaces mating with the track 216A. An endless, cogged belt 226A extends between a pair of stationary bearing blocks 228A and 230A, each supporting a toothed wheel or gear 232A, 234A, respectively. The belt 226A is secured to the rearward carriage plate 212A by clamp 236A (FIG. 12) or other suitable means so that movement of the belt 226A in forward or rearward direction results in corresponding forward or rearward movement of plate 212A as well as front plate 214A (connected via screw 218A). The manner in which the belts 226A (and 226B) are driven will be described further below.

The carriage half section 210A also includes a pair of side cylinders 238A, 240A which are supported on plate 214A by means of depending brackets (one shown at 242A in FIG. 12). These side cylinders extend transversely to the cylinders 182, 184, 186 and 188 and also to the direction of movement of the conveyor 16. When the carriage 210 is in its home position, piston rods 244A and 246A of the respective side cylinders 238A, 240A are extended inwardly as shown in phantom in FIG. 11 (and in solid lines in FIG. 16), in an area underlying the longitudinally extending retractable rods 190, 192, 194 and 196. Thus, when similar transverse piston rods 244B and 246B are extended, support is provided for the cut media pad 28 when the rods 190, 192, 194 and 196 are retracted. In other words, when rods 190, 192, 194 and 196 are retracted, the filter pad 28 will fall onto the rods 244A, 246A, 244B and 246B of the carriage 210.

As best seen in FIGS. 14–16, the carriage half section 210A is also provided with longitudinally extending, vertically oriented guide plates 248A, 250A, one fixed to each of the support plates 212A and 214A which are located along the side edges of the conveyor, above and generally aligned with (but slightly inside of) guide 46. These guide plates 248A and 250A, in combination with similar guide plates 248B and 250B on carriage half section 210B, help to properly align and orient the filter pad 28 as it moves from the carriage into the frame 20.

As described below, the guide plates 248A and 250A mount a pair of flipper devices 252A, 254A, respectively, each extending transversely of its respective guide plate. These flippers, best seen in FIGS. 16 and 17 are used to support the media pad 28 (along with side cylinder piston rods 244A, 246A, 244B and 246B), and to load the media pad into the filter frame 20. By suitable adjustment of the front carriage plate 214A relative to the rear carriage plate 212A as described above, it will be appreciated that the flippers 252A and 254A may be located generally along front and rear edges of the media pad 28.

The flippers are identical and, therefore, only one need be described in detail. With reference to FIGS. 16 and 17, the flipper 252A includes a horizontal support block 256A incorporating a pivot pin or shaft 258A by which the flipper is pivotally mounted to the guide plate 248A. An upstanding tab 260A extends upwardly from the rearward end of the block 256A, while block 256A is provided with a horizontal tab or plate 262A. The tab 260A lies adjacent a transverse vertical guide tab 263A also mounted to the guide plate 248A. It will be appreciated that the guide plate 248A, guide tab 263A and tab 260A can be found in each corner of the carriage and generally confine the pad 28 within the four corners of the carriage 210.

The flipper pivot pin or shaft 258A extends into a block 265 (FIG. 14) wherein, by gearing or other suitable means, it interacts with a pair of opposed pneumatic rotary cylinders 264A, 266A which drive the flipper approximately 90° in counterclockwise and clockwise directions during transfer of the media pad 28 from the carriage 210 to the frame 20. In this regard, the tab 260A of the flipper 252A is provided with a pair of air blast discharge orifices 268A, 270A located in a substantially vertical surface adjacent the horizontal support block 256A. Air supply lines 272A, 274A are connected to suitable pneumatic cylinders supported on the machine frame. Air blasts are used to facilitate and enhance the transfer of the media pads 28 from the carriage 210 to the frame 20 as described further below.

Before discussing the operation of the carriage, two other features of the apparatus must be noted. Fixed to stationary machine components above the carriage 210 when in the home position are additional guide plates and cylinders. As best understood from FIG. 16, an upper, vertically oriented guide plate 276A is located in alignment with lower guide plates 248A and 250A. This plate and its counterpart on carriage half section 210B serve to guide the pad 28 as it falls from the retractable support rods 190, 192, 194, 196 onto the side cylinder rods 244A, 246A, 244B and 246B. Vertically oriented cylinders 278A, 280A are located above the carriage and inwardly of the conveyor edge (via brackets 282A, 284A) so as to be located over the filter media pad 28 when the latter is cut. These cylinders, in combination with counterpart cylinders 278B and 280B (FIG. 11) are thus located within the four corners of the media pad 28 as the latter is seated on the retractable rods 190–196 after cutting. Piston rods of the cylinders 278A, B and 280A, B may be used as the pad 28 drops onto the side cylinder rods 244A, B and 246A, B. Under normal circumstances, the pad 28 will simply fall under the influence of gravity onto the side cylinder rods 244A, B and 246A, B. However, if the pad 26 is slightly out of alignment and hangs up on the vertical guide plates 276A, B, then the piston rods of cylinders 278A, B and 280A, B will serve to push the pad downwardly. As a practical matter, the cylinders 278A, B and 280A, B are always actuated in the normal practice of the assembly process even though properly aligned pads will fall slightly ahead of the downwardly extending rods. It may also be seen from FIGS. 12 and 14–16 that cylinders 280A, B are movable toward and away from cylinders 278A, B by reason of adjustment screws 279A, B which are threadably received in brackets 282A, B and rotatably captured in brackets 284A, B. Thus, rotation of hand wheels 283A, B will adjust the cylinders 280A, B toward or away from cylinders 278A, B depending on the length of the frame 20.

As best seen in FIG. 16, the bracket 282A supports a forward transverse guide 285A which aligns generally with the forward edge of the pad 28 when the latter is fed by pinch rollers 82, 84 to the cutting position. Location of the guide 285A (and a counterpart on the B side, not shown) is set by adjustment of the cylinders 280A, B as described above.

Retuning to FIG. 11, it may be seen that the carriage belts 226A, B are connected via a transverse spline 286 to a motor 288 which rotates the spline in opposite directions to drive the carriage 210 forwardly and rearward directions as also described below.

Also with reference to FIG. 11, it may be seen that frame support plates 290A and B which support the entire carriage 210 as well as various "fed" machine components, are mounted on transverse rails 292 and 294. With the aid of a transversely oriented adjustment screw 295, the carriage half section 210B, including side cylinders 238B, 240B, flippers 252B, 254B, as well as fixed guide plate 276B and cylinders 278B, 280B can be moved toward or away from the counterpart components on the A side to thereby accommodate filter frames of different widths. Note also that the spline arrangement on shaft 286 in combination with a linear bearing block 228B supporting belt 226B, permits the motor 228 to rotationally drive the belts while accommodating transverse adjustability.

The sequence of events during a filter media pad loading process will now be described. To facilitate understanding, it is initially noted that FIGS. 11, 14, 15 and 16 illustrate generally the extent of the travel of the carriage between home and remote positions. In FIGS. 11, 14 and 16, however, the carriage is shown just downstream of a home position for the purposes of illustration. In FIG. 16, for example, when the carriage is in the home position, flipper 254A would be located directly under the transverse guide 283A. FIG. 15 shows the carriage at the end of its forward stroke, i.e., at a position after loading the media pad 28 into the frame but prior to reverse movement to home. Turning now to FIGS. 18–25, simplified side elevations are used to illustrate the loading sequence. The Figures show only the A side of the apparatus, but reference is made to B side counterparts where appropriate. In addition, for purposes of this description, reference will be made to a first filter media pad 28 and material following which is to form a second media pad 28' behind the first pad.

Figure 18:
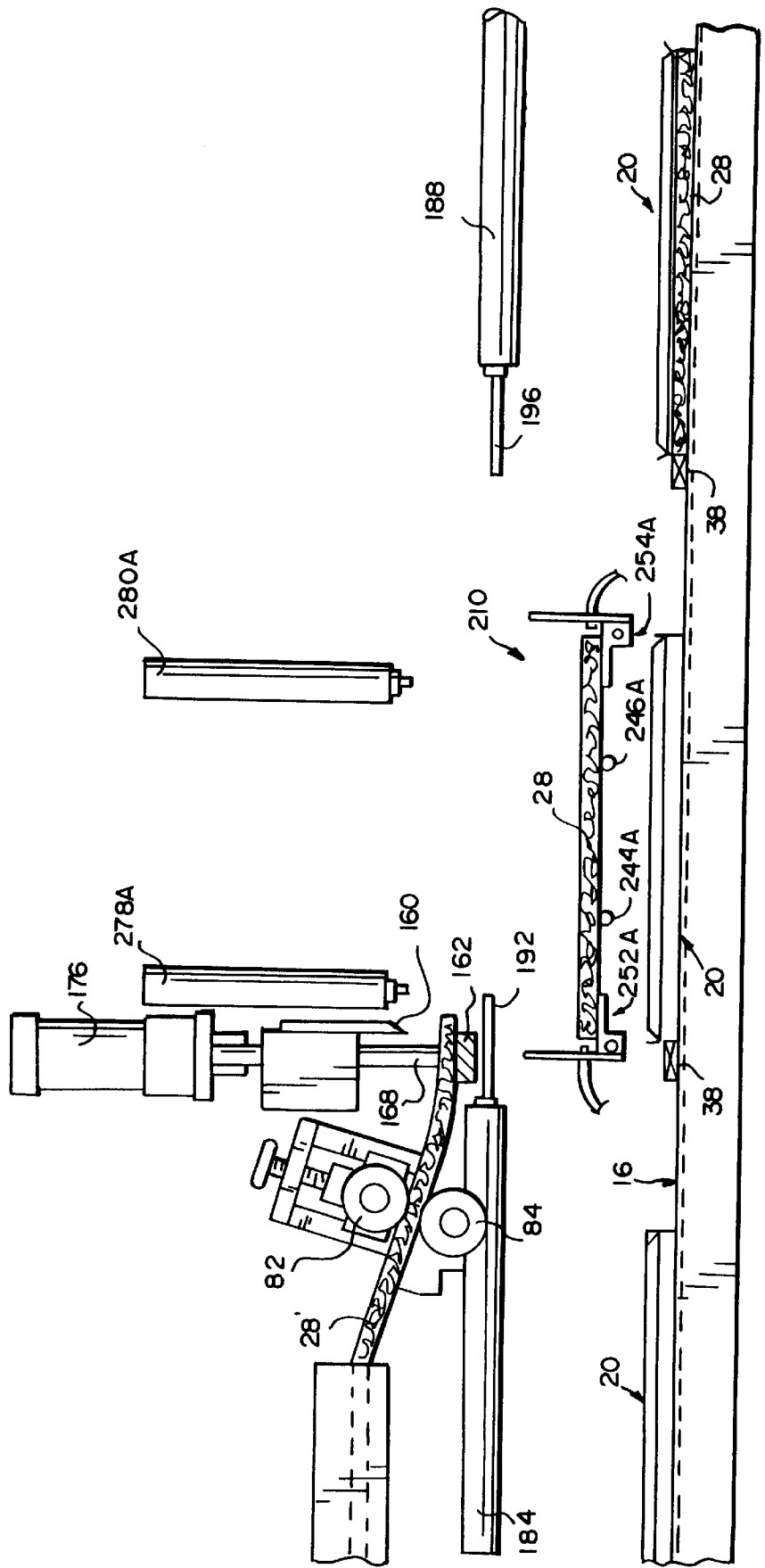
FIGS. 18–25 are simplified side elevations illustrating a filter media pad cutting, loading and transporting sequence in accordance with the exemplary embodiment of the invention.

In the position illustrated in FIG. 18, the carriage 210 is in its home position with a first discrete filter pad 28 supported by the side cylinder rods 244A, B and 246A, B as well as by the horizontal support plates of the flippers 252A, B and 254A, B. At this stage, additional filter pad material 28' is beginning to be fed by pinch rollers 82 and 84 into a cutting position. The longitudinally extending retractable rods 190, 192, 194 and 196 are also beginning to extend in opposite horizontal directions to provide underlying support for the material 28' during the cutting operation.

Figure 19:
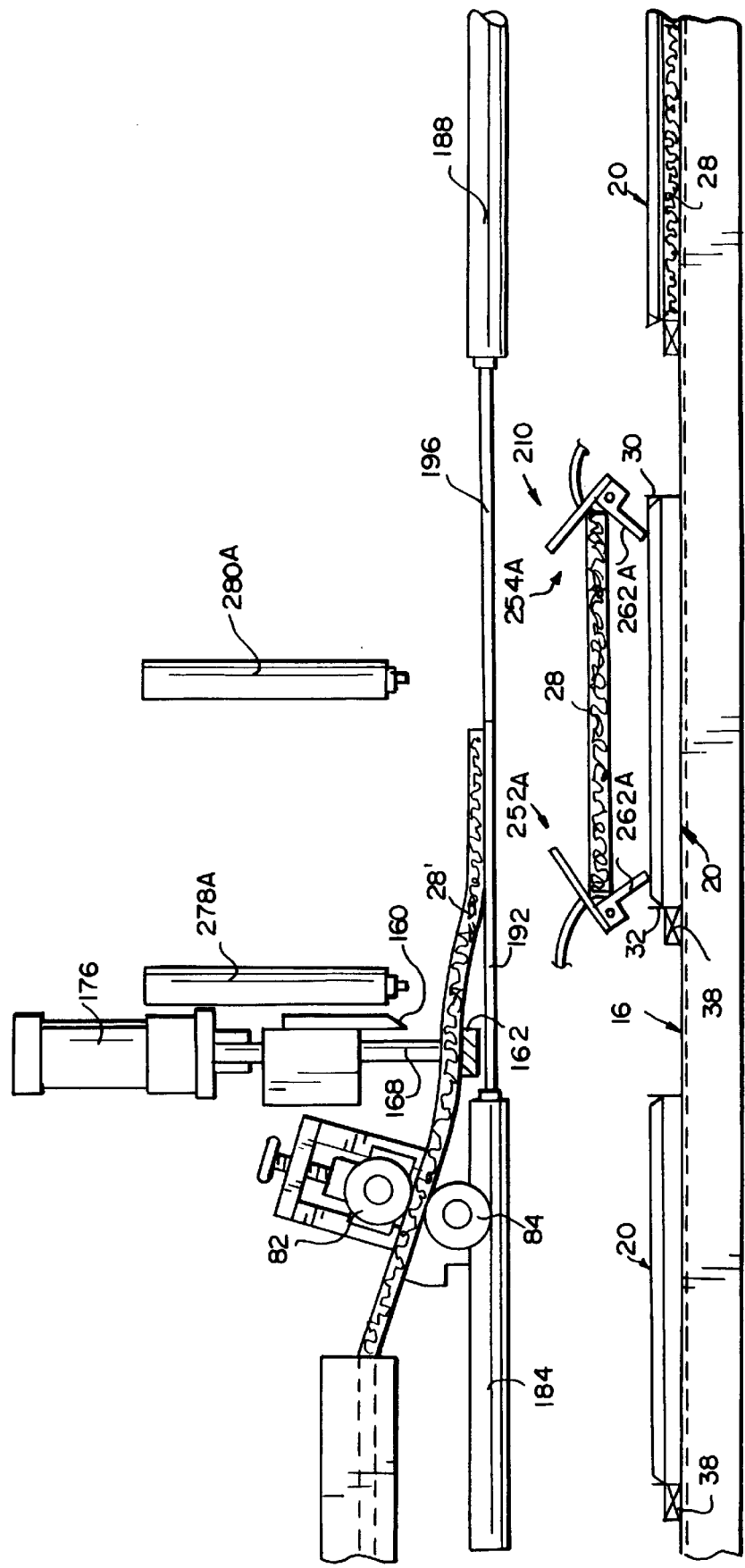

In FIG. 19, the carriage 210, driven by motor 288, has begun to accelerate in a forward direction to a point where it matches the line speed of the conveyor 16. The side cylinder piston rods 244A, B and 246A, B have been retracted and the flipper assemblies 252A, B and 254A, B have begun to rotate to free up the pad 28 for insertion into the filter frame 20. At the same time, the support rods 190, 192, 194 and 196 are fully extended and support the filter pad material 28' as it is fed by the pinch rollers 82, 84 to the cutting position.

Figure 20:
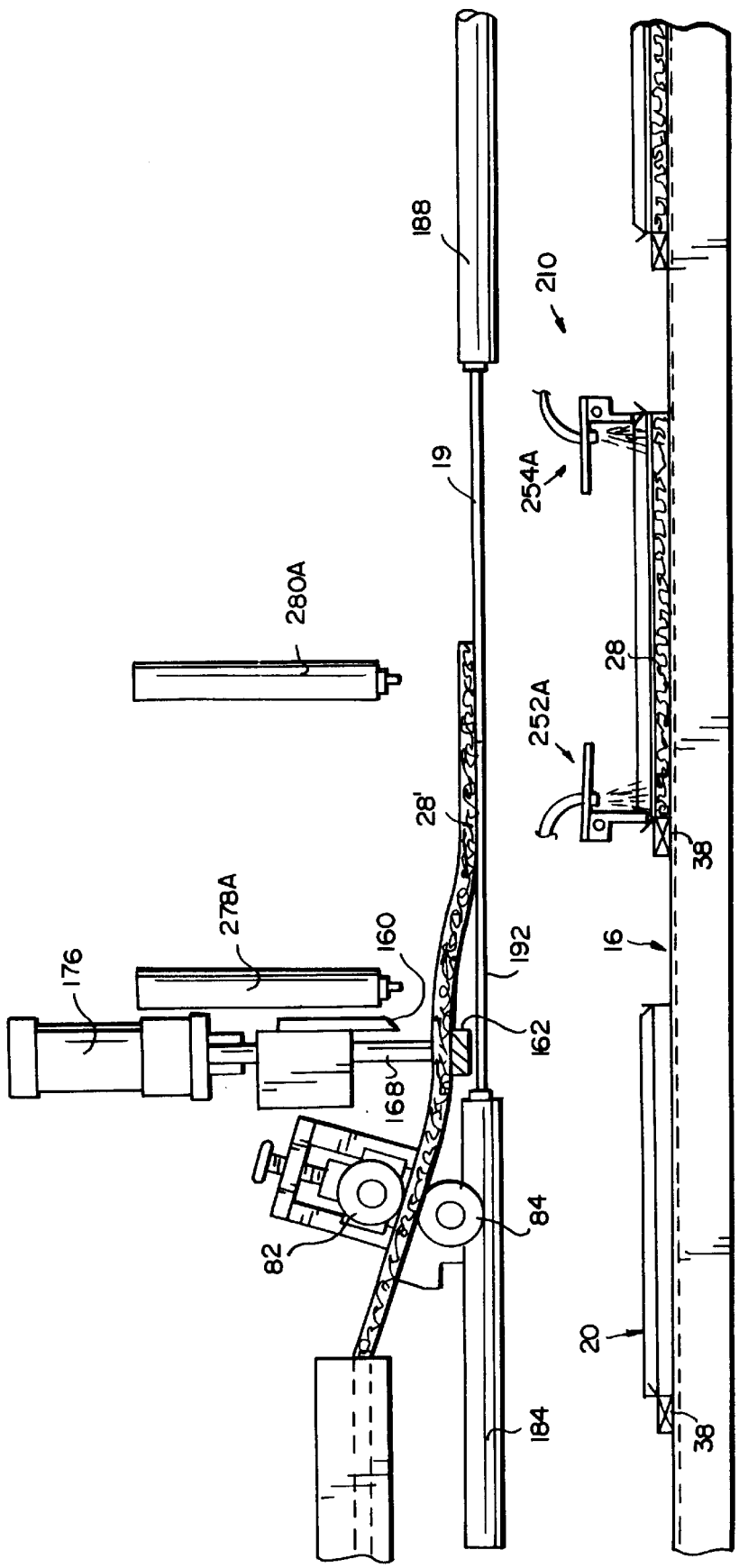

In FIG. 20, the flipper assemblies 252A, B and 254A, B on the carriage 210 are now fully rotated through 90° to the loading position and air blasts are used to fully insert the pad 28 within the filter 20. By rotating the flippers to the position illustrated in FIG. 20, it will be appreciated that the filter pad 28 is free to simply fall into the frame 20 but the air blasts are utilized to insure full insertion particularly in the event of any hang-up of the filter pad material on any of the machine components. It is also to be understood that the side flaps of the filter frame 20 continue to be maintained in an open position by the upper side guides 50 and 52 and that, prior to initiation of the air blast, the horizontal plates 262A, B of the flipper assemblies open the front and rear flaps 30, 32 of the frame 20 and hold them open so that the pad 28 has ample room to be seated within the filter frame.

Figure 21:
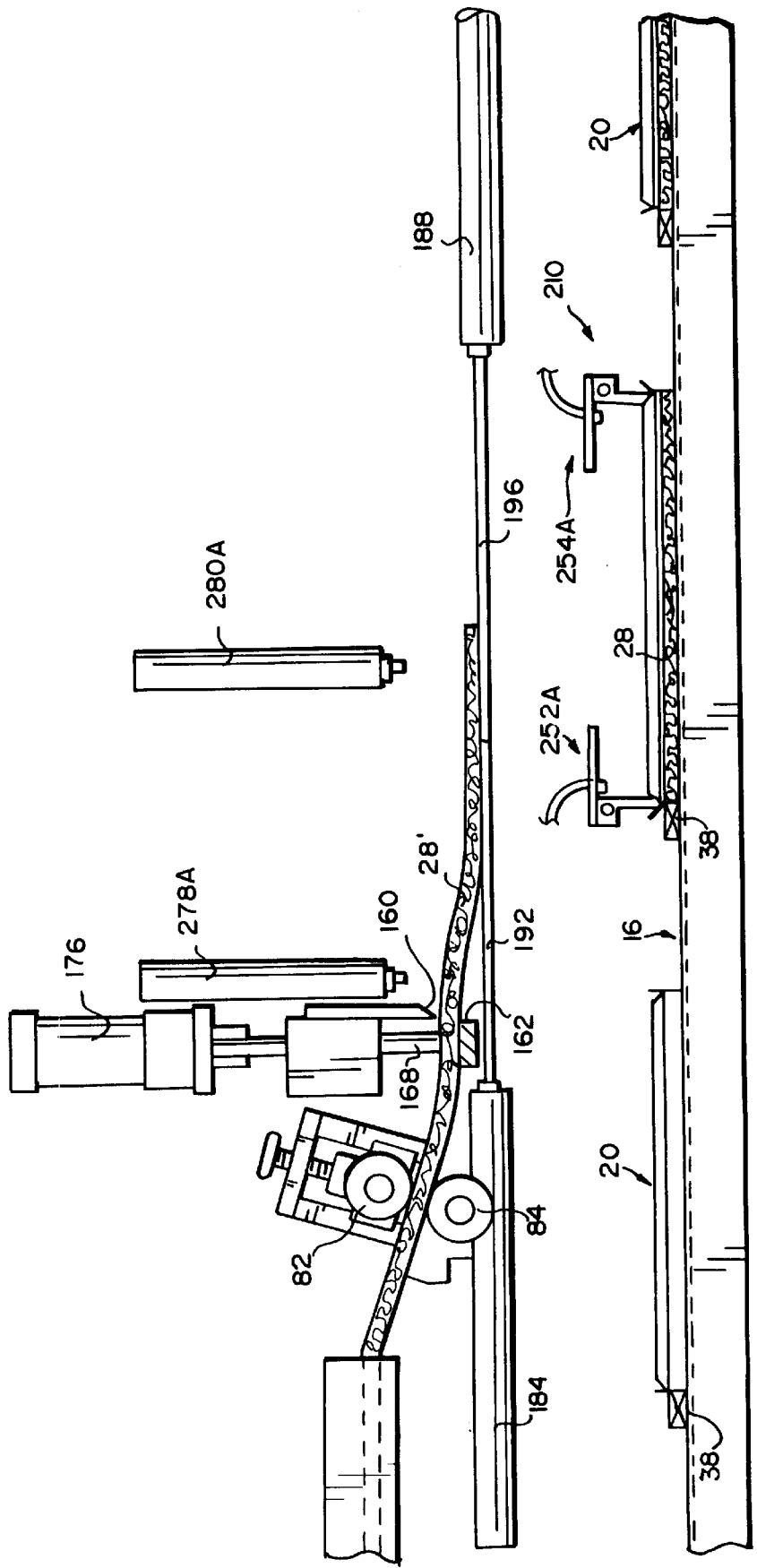

In FIG. 21, the carriage 210 is approaching the forward-most end of its stroke before returning to the home position. The filter pad material 28 is now in position for cutting, with a predetermined length of media material 28' fed by pinch rollers 82, 84 to a position forward of the cutting blades 160.

Figure 22:
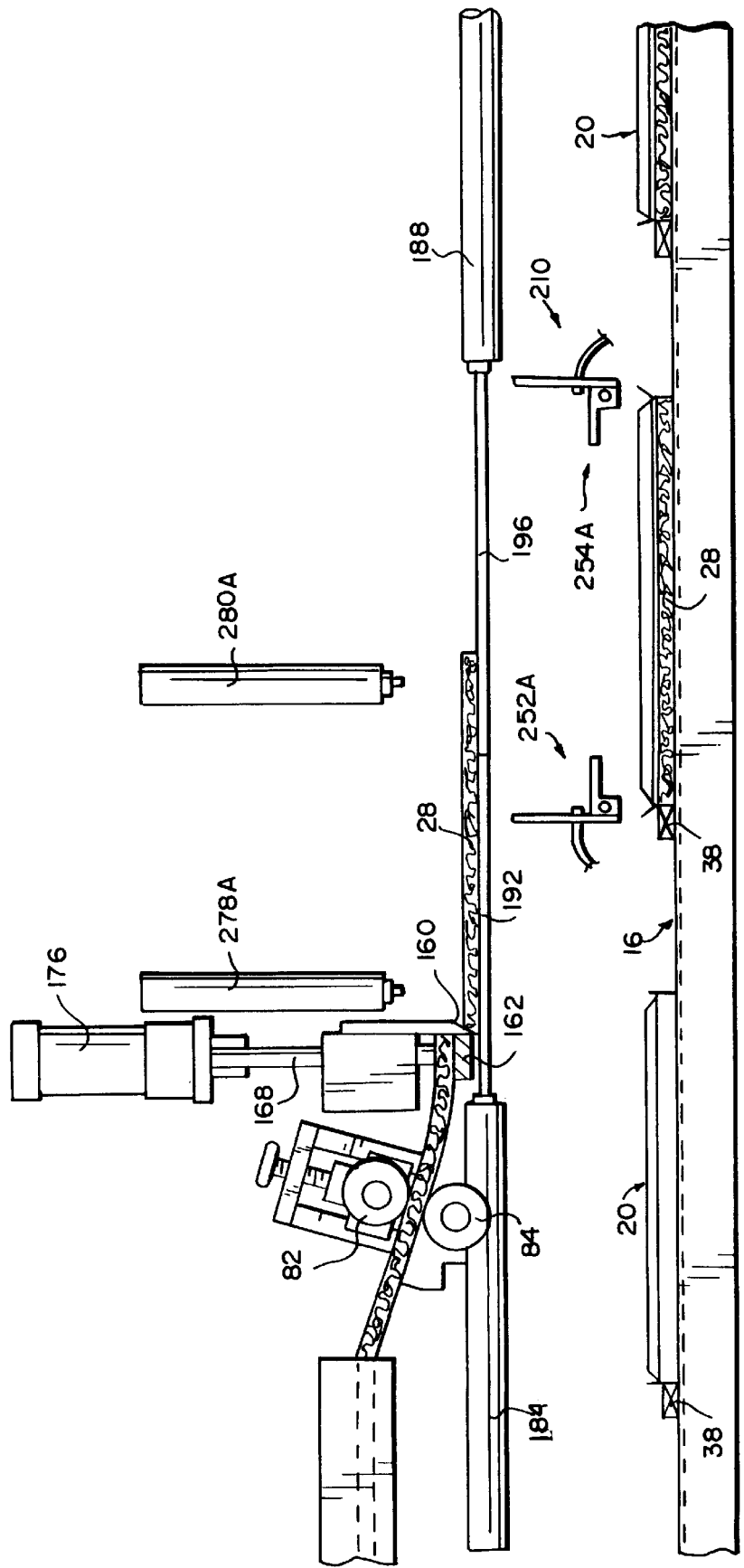

In FIG. 22, the flipper assemblies 252A, B and 254A, B have rotated 90° back to a support position and the carriage 210 is at the end of its forward travel, ready for return to the home position. Meanwhile, the second filter pad 28' has been cut by blades 160, 162 and is supported on the retractable rods 190, 192, 194 and 196. It should be noted here that the stroke of the carriage 210 is held constant, i.e., it is long enough to accommodate frames of all anticipated lengths and the time necessary to bring the carriage up to the line speed of the conveyor 16. The forward speed of the carriage is a function of the speed of the conveyor 16, but the return speed may be set.

Figure 23:
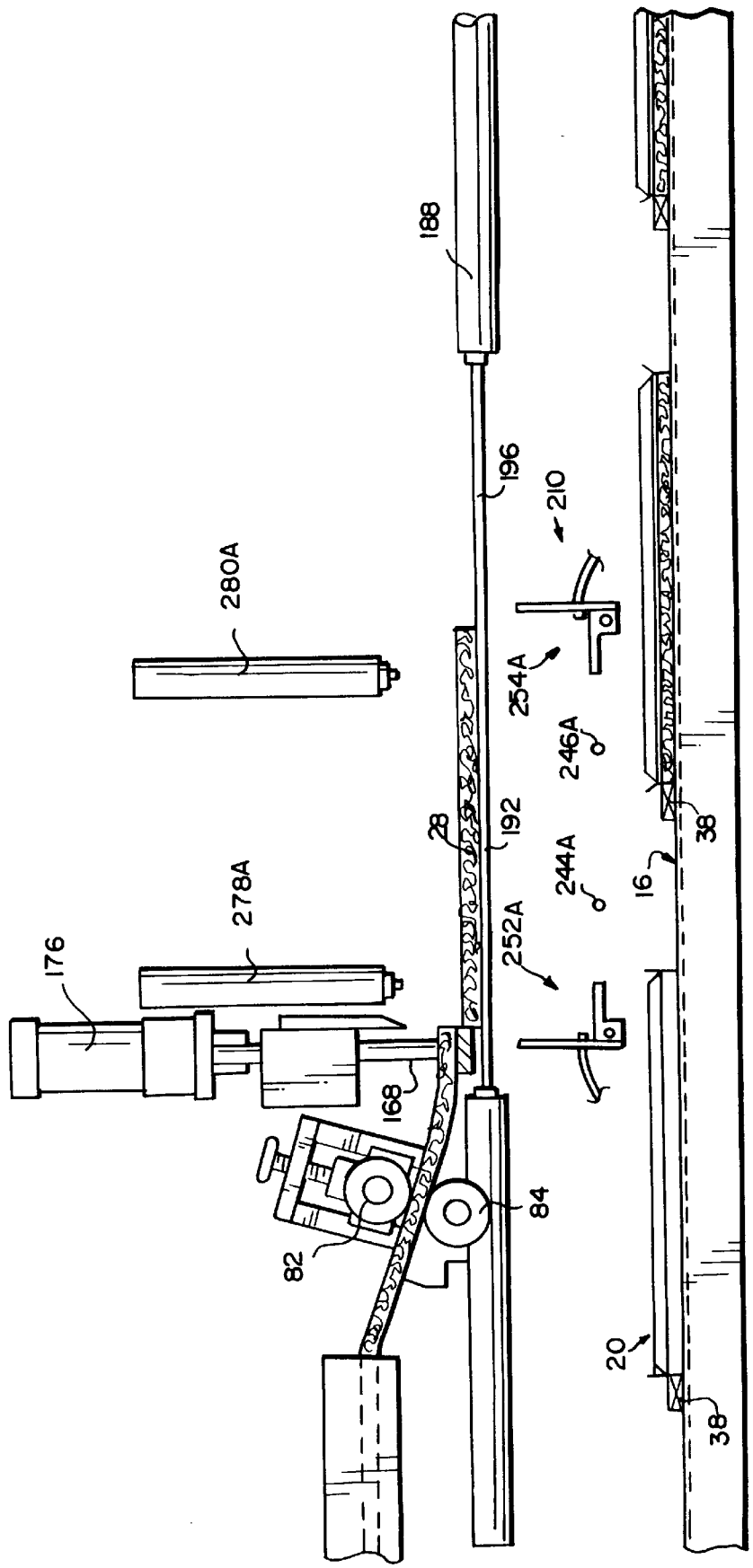

In FIG. 23, and as the carriage 210 returns to its home position, the side cylinders 244A, B and 246A, B are again extended to provide support for the pad 28' upon retraction of the longitudinally extending cylinders 190, 192, 194 and 196.

Figure 24:
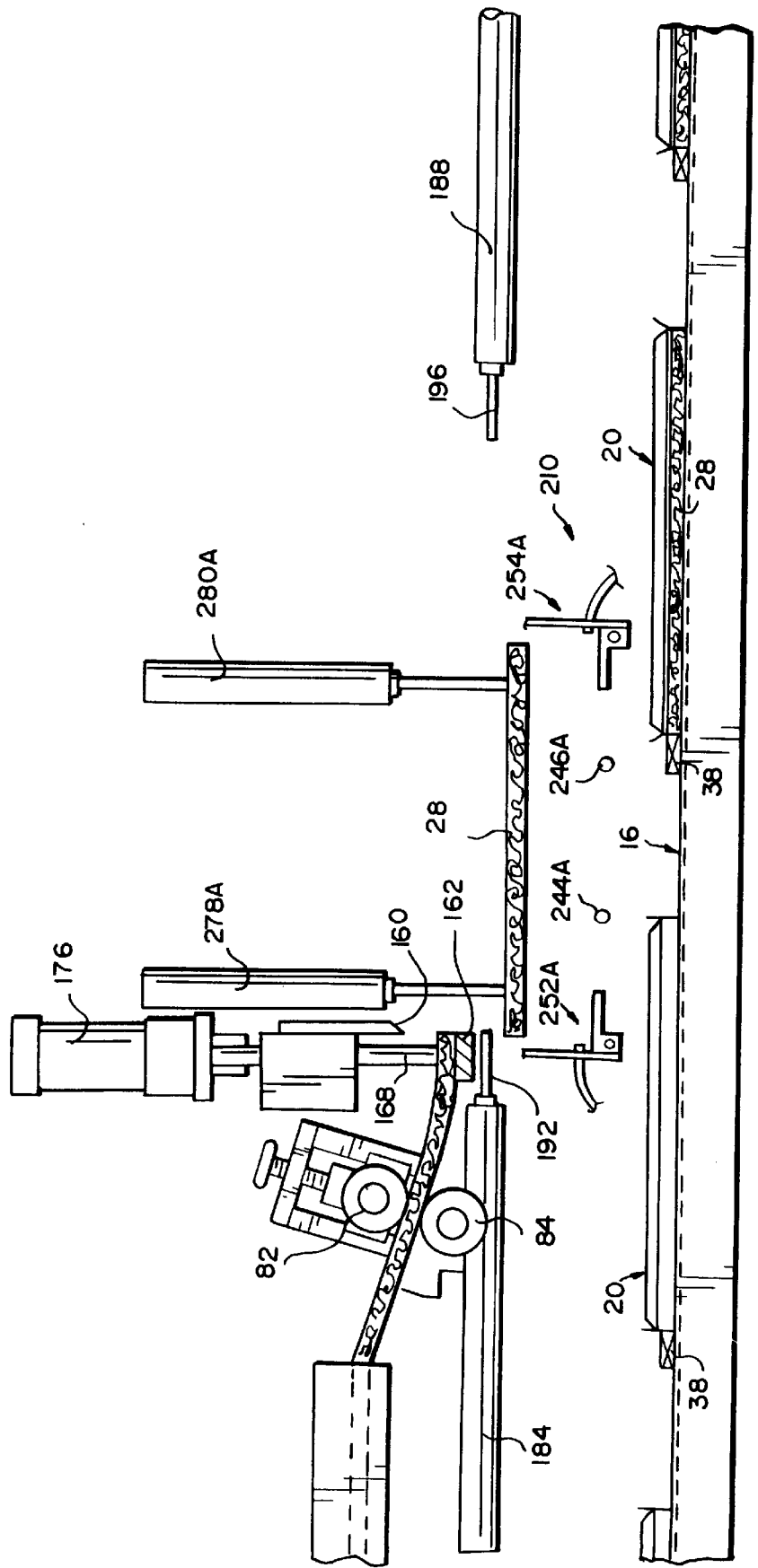
Figure 25:
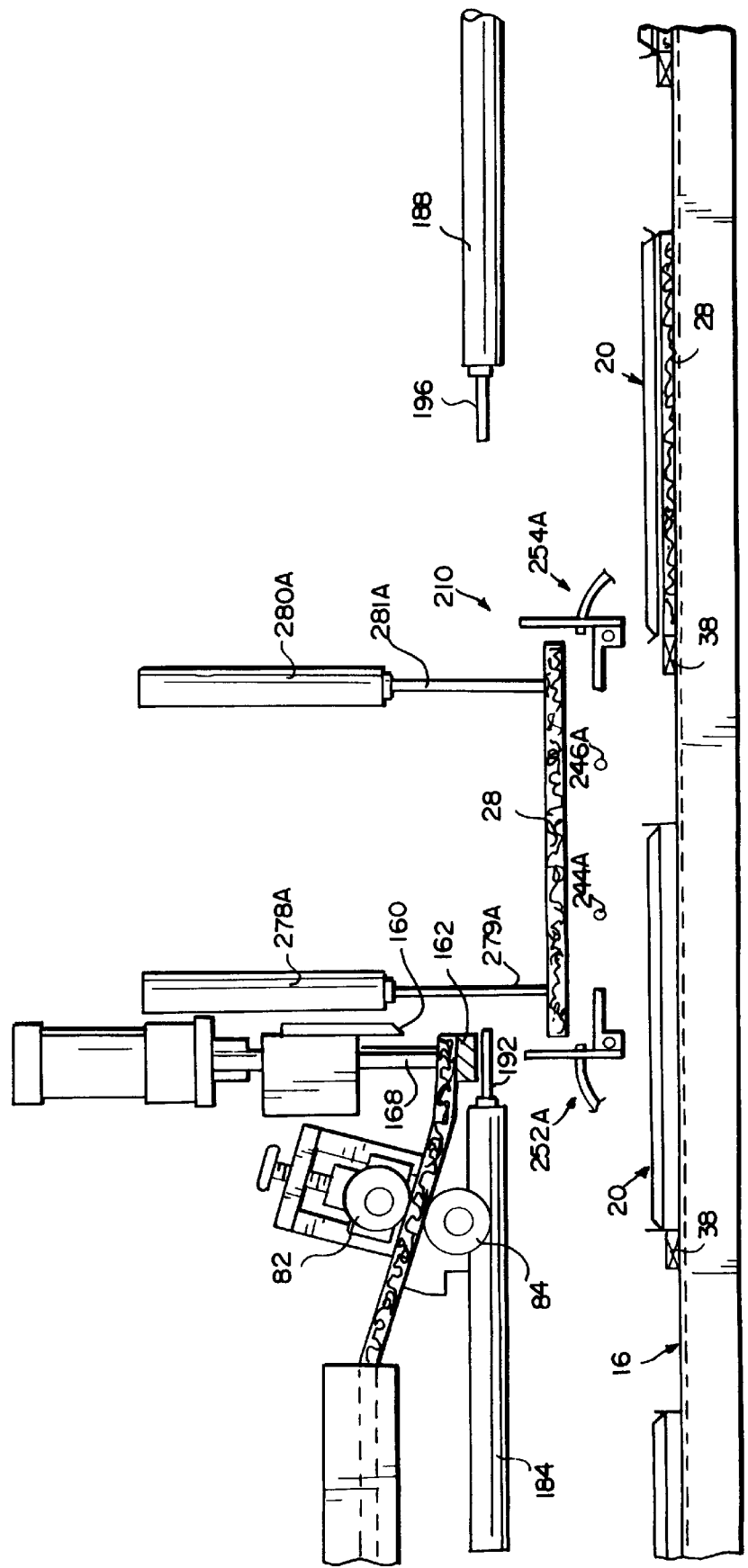

In FIG. 24, the longitudinal rods 190, 192, 194 and 196 have been retracted and the filter pad 28' falls onto the carriage 210, supported by the side cylinders piston rods 244A, B and 246A, B as well as flipper assemblies 252A, B and 254A, B. As already discussed, the piston rods 279A, B and 281A, B of the vertically arranged pusher cylinders 278A, B and 280A, B facilitate movement of the filter pad 28' onto the carriage 210, particularly in the event the filter material hangs up along the vertical guide surfaces (such as guide plates 276A, B). In FIG. 25, a continuation of the process is shown where the filter pad 28' is about to come to rest on the side cylinder piston rods 244A, B and 246A, B and flipper assemblies 252A, B and 254A, B. Once the filter pad 28' is seated on the carriage 210, the vertical rods 279A, B and 280A, B are retracted and the sequence continues at the point illustrated in FIG. 18.

Returning to FIG. 1, after the media pad has been loaded into an associated filter frame 20, the assembly continues along the conveyor 16 to a location where the front and back flaps of the filter frame are folded downwardly as described below and, as the frame continues beneath a flat plate defining an upper or top surface of an oven or other suitable heating means, the upper side guides 50, 52 along the conveyor 16 edges gradually change in profile so that the side flaps 34, 36 of the filter frame 20 are gradually folded downwardly to a horizontal position.

Figure 26A:
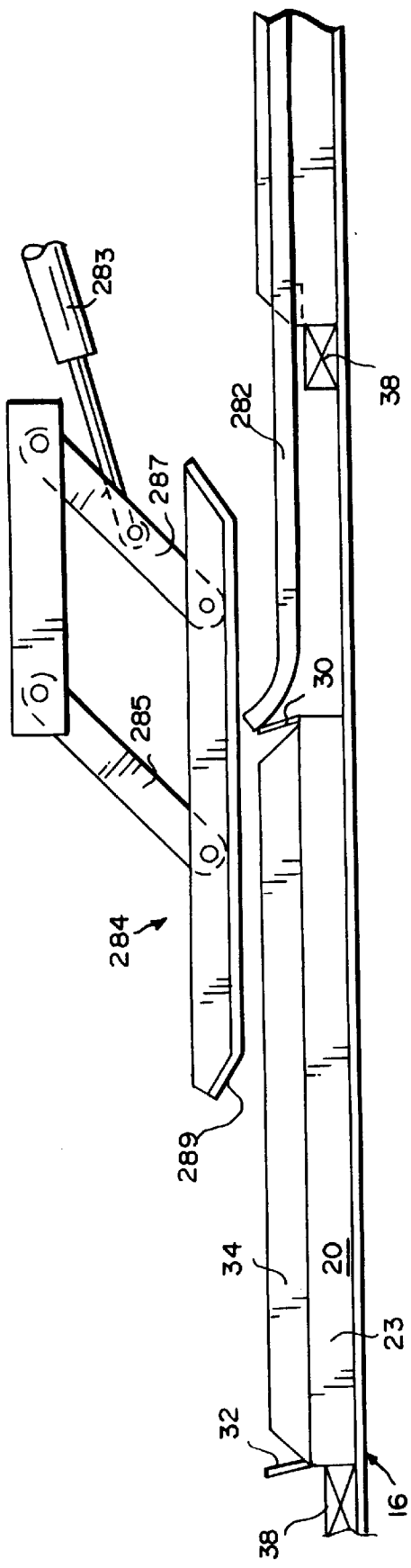
FIGS. 26A and B are partial side elevations illustrating the manner in which the front and rear flaps of the filter frame are folded after insertion of the filter media pad.
Figure 26B:
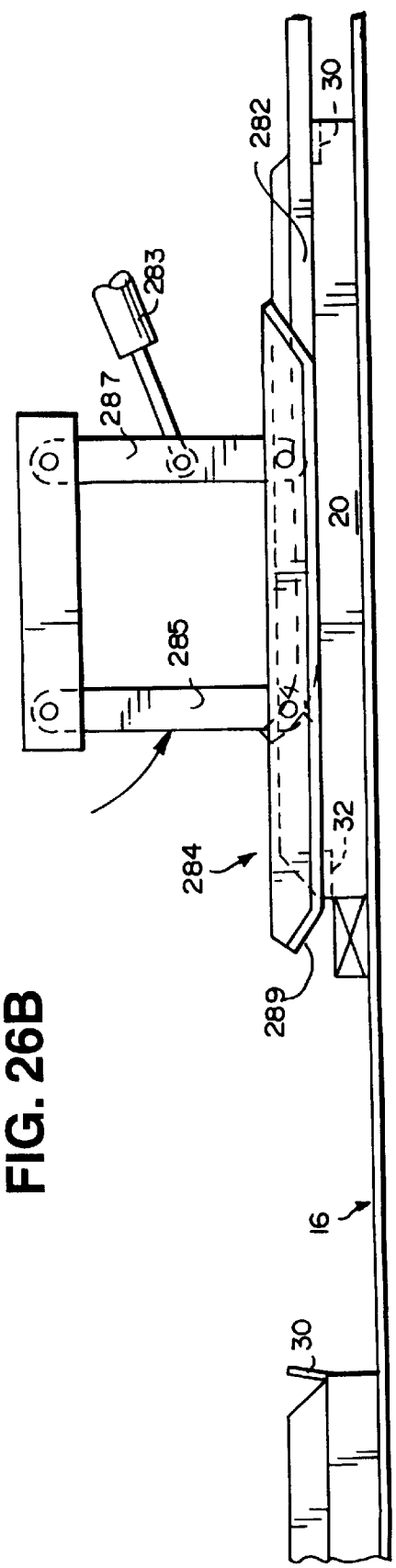

With reference to FIGS. 26A and B, for relatively small filter frames, the front flap 30 is closed by a stationary camming ski 282 (there may be two such skis in laterally spaced relationship as shown in FIG. 1) and the rear flap 32 is closed by a retractable ski 284 (actuated by cylinder 283 via links 285, 287) which swings down from above the filter frame assembly to fold the rear flap 32. On the other hand, for filters of relatively large size, the filters are sufficiently close together that the retractable ski 284 will close both the rear flap 32 of a lead frame assembly and the front flap of a trailing assembly. In other words, as the ski 284 swings downwardly, it will close the rear flap 32 of a lead frame and, while in a pause mode at the end of its stroke, the lead flap 30 of the next frame will be engaged by the curved flange 289 on the ski. These front and rear flaps are then held in the folded position by the stationary skis 282 as the frame enters the oven. At the same time, the side flaps 34, 36 are cammed over into a folded position by the side guides 50, 52 which gradually change from vertical to horizontal orientation as the frame enters the oven. As the assembly continues into the oven or other suitable heating device, previously applied adhesive will be activated to thereby seal the frame to the media pad. The retractable ski assembly can be similar to that disclosed in commonly owned U.S. Pat. No. 5,429,580, and it may be actuated by the presence of a filter frame at a predetermined location along the conveyor 16.

A programmable logic controller is utilized to control the apparatus described hereinabove. Input cards in the PLC receive signals from field sensors and convey a status of various of the machine components. The information received by the PLC through the input cards is processed by the program and action (control) signals are sent to field devices by means of the output cards. The program within the PLC controls all machine operations sequentially as described hereinabove.

Figure 27:
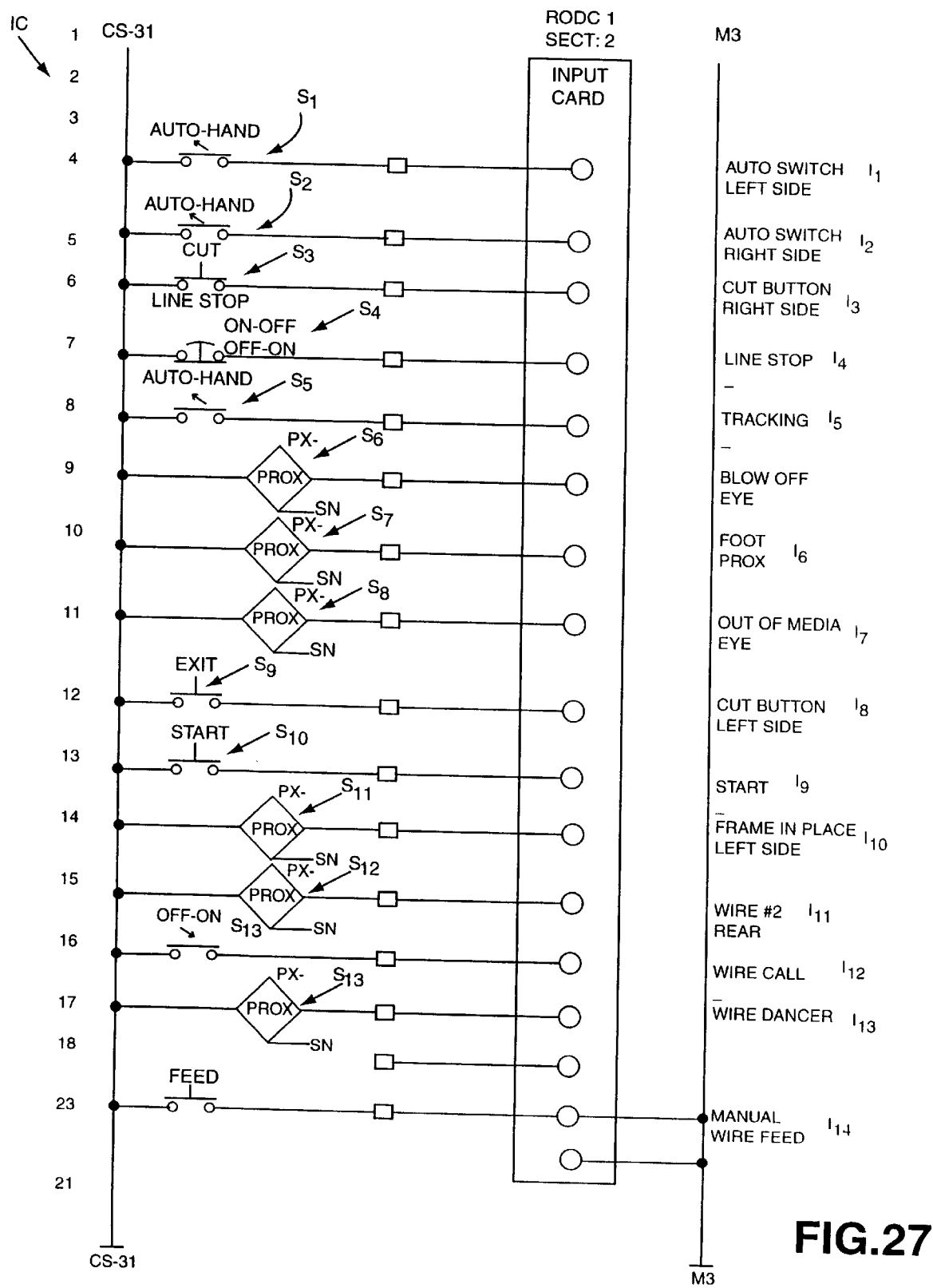
FIG. 27 is a diagram of an input card of a programmable logic controller used to control the filter assembly apparatus in accordance with an exemplary embodiment of the invention.

FIG. 27 illustrates an input card IC to the PLC in accordance with the invention. Switches on the left of the card designated S1–S5, 9, 10, 13 and 15 are all push and selector buttons. Switches designated S6–8, 11, 12 and 14 are proximity switches or electric eye devices. With reference now to the legends appearing on the righthand side of FIG. 27, the inputs $I_1$ and $I_2$ indicates to the PLC to control the machine in automatic mode, i.e., the program within the PLC is to take over the complete operation of the apparatus. Inputs $I_3$ and $I_8$ provide manual instructions to the PLC to cycle the shear cutter 158 to cut the filter media material 28. This operation is used for equipment set-up purposes only.

Input from $I_4$ is used to stop operation of the apparatus at will.

Input from $I_5$ indicates to the PLC how the media tracking or alignment mechanism (the media edge detection device) is to operate, i.e., manually or automatically.

Input from $I_6$ indicates to the PLC when a filter frame is aligned.

Input from $I_7$ provides information from an optical sensor, indicating when the supply of filter media material has run out, resulting in stoppage of the apparatus.

Input from $I_9$ tells the PLC to commence operation.

Input from $I_{10}$ indicates to the PLC when to start a loading cycle, beginning with the activation of pinch rollers 82, 84 to feed a predetermined length of material for cutting.

Input from $I_{11}$ indicates when expanded wire flow guides are to be used and from which of the front or rear drums the wire will be fed.

Input $I_{12}$ and $I_{13}$ indicate to the PLC when to feed wire from the front or rear wire supply drums or pay out areas.

Input $I_{14}$ overrides the automatic expanded wire feed, and is used for set-up only.

Figure 28:
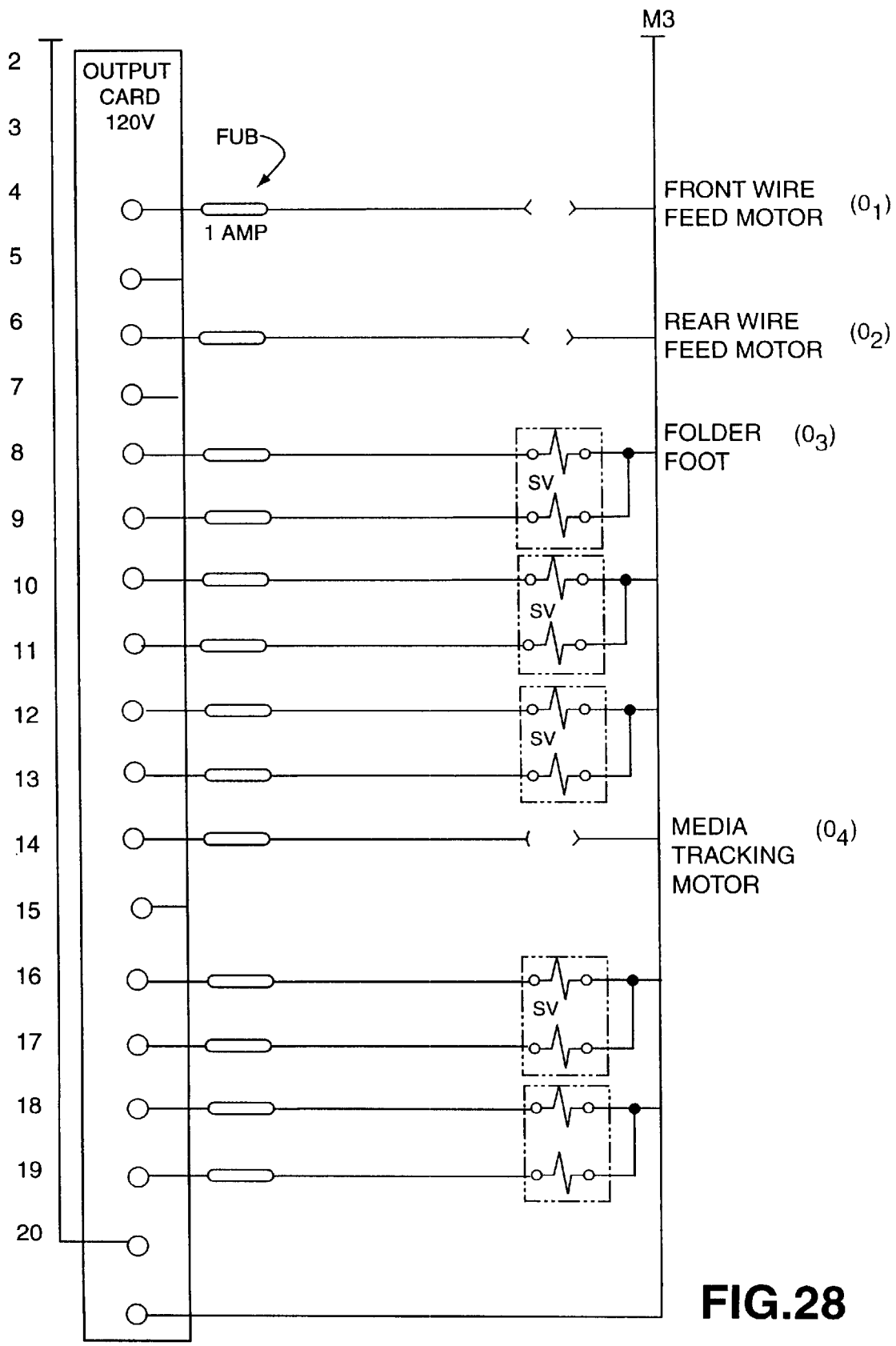
FIGS. 28 and 29 are diagrams of output cards in the programmable logic controller utilized to control the apparatus in accordance with the exemplary embodiment of the invention.

FIG. 28 illustrates a first output card for the PLC. The output $O_1$ to the front wire feed motor feeds expanded metal wire on demand from the front roll. Output $O_2$ to the rear wire feed motor feeds wire on demand from the rear wire supply roll. These outputs are not employed if wire sheeting is not used in the assembly process.

Output $O_3$ to the folder foot (ski 284) closes the filter frame rear flap 32 and is energized at predetermined times when the filter frame 20 reaches a target location on the conveyor 16.

Output $O_4$ to the media tracking motor 140 adjusts pinch roller pressure to steer the media pad material 28 into the desired alignment.

Figure 29:
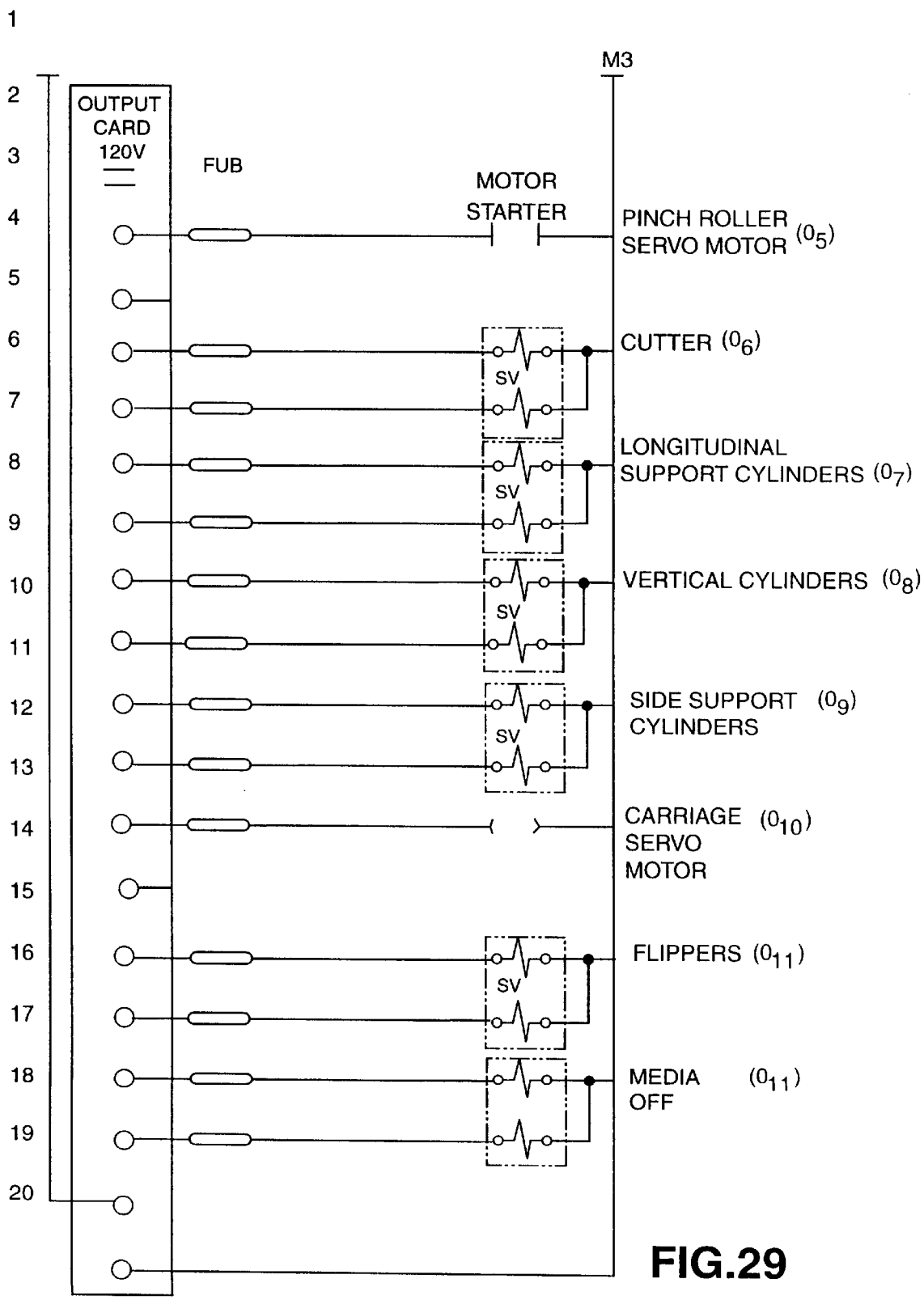

FIG. 29 illustrates a second output card for the PLC. The output $O_5$ to the pinch roller servo motor feeds media material and (if used) expanded wire through the shear cutter 158 on command.

The output $O_6$ to the cutter activates cylinder 176 to cut a predetermined length of media material.

The output $O_7$ to the longitudinal support cylinders 1 causes the piston rods 190, 192, 194 and 196 of these cylinders to 182, 184, 186 and 188 extend to receive media material fed by the pinch rollers 82, 84 and retract when carriage returns empty to the home position.

The output $O_8$ to the vertical cylinders 278A, B and 280A, B are retracted when media pad is cut and supported on rods 190, 192, 194 and 196 and are extended to insure the pad 28 drops onto the side cylinder rods 244A, B and 246A, B of the carriage 210.

The output $O_9$ to the side support cylinders 238A, B and 240A, B causes these cylinder rods 244A, B and 246A, B to extend with the carriage at the home position and to retract prior to actuation of the flippers.

The output $O_{10}$ to the carriage servo motor 288 starts to move the carriage 210 when an empty filter frame reaches a predetermined position along the conveyor 16, approximately at the carriage home position.

The output $O_{11}$ to the flippers 252A, B and 254A, B retracts the flippers permitting them to receive material dropped from the longitudinally extending support rods 190, 192, 194 and 196. These flippers are caused to rotate when the carriage 210 is motion to drop the filter media pad 28 and metal flow guides (if used) into the filter frame, while opening the front and rear flaps of the frame.

The output $O_{12}$ to the air blast cylinders is used to control the air blast to thereby insure that the media pad 28 drops into the filter frame 20.

It will be appreciated that the software within the PLC coordinates and controls the overall process so that the various components are all timed to actuate in the most efficient manner.

Current testing indicates that a complete cycle of the loader carriage can be completed in less than two seconds so that a maximum production rate of 30 filters per minute is contemplated. It is thus expected that production rates at least in excess of 20 filter frames per minute and possibly as many as 30 per minute will lead to dramatic production increases over and above that which is possible through manual loading.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for assembling a filter having a peripheral frame and at least one filter media component, the apparatus comprising a continuous conveyor for feeding in a forward direction a plurality of filter frames, in succession, to a plurality of workstations, each filter frame having a closed periphery which is defined by, with reference to said forward direction, a generally upstanding leading flap, side flaps and a trailing flap, the workstations arranged on a fixed machine frame including:
    a) a first station including at least a pair of tools located so as to engage and open said side flaps;
    b) a second station downstream of said first workstation in said forward direction including a media component supply roll, a cutter adapted to cut a predetermined length of media component; guide elements mounted on said fixed machine frame proximate to said cutter and adapted to guide the cut length of media component for movement away from the cutter; and a reciprocable carriage supported on said fixed machine frame above the conveyor and adapted to receive the cut length of media component at a first position, the carriage having a motive drive operatively connected to the carriage and adapted to accelerate the carriage in said forward direction to a second loading position where the carriage is located directly above an opened filter frame on the conveyor; and forward and rearward flippers mounted on said carriage and adapted to open said leading and trailing flaps and to move said media component from said carriage into said filter frame.

2. Apparatus according to claim 1 wherein said pair of tools at the first station include rotatably mounted augers arranged parallel to one another with longitudinal axes parallel to the forward direction of said filter frames, and wherein each auger has a spiral flight engageable with said side flaps.

3. Apparatus according to claim 1 wherein said cutter is arranged for vertical reciprocation, said cutter having a blade extending transverse to the forward direction of said filter frames.

4. Apparatus according to claim 1 wherein said second station includes a plurality of retractable rods movable in a horizontal direction to support said length of media component during cutting thereof.

5. Apparatus according to claim 4 wherein said plurality of retractable rods are driven by fluid cylinders.

6. Apparatus according to claim 4 and wherein said second station includes a second pair of retractable rods movable in a vertical direction to facilitate movement of said cut length of media component in a downward direction toward said conveyor.

7. Apparatus according to claim 6 wherein said carriage includes, fluid means for moving said flippers between media support and media insert positions.

8. Apparatus according to claim 7 wherein each of said flippers supports a pair of fluid inserters which are arranged and adapted to discharge air blasts toward said cut length of media component to thereby enhance insertion of said cut length of media component into said filter frame.

9. Apparatus according to claim 8 wherein said carriage is provided with transversely oriented, retractable support rods for supporting the filter media pad after cutting but before insertion into the frame.

10. Apparatus according to claim 1 and including a pair of pin rollers located upstream of said cutter, at least one of said pinch rollers motor driven and the other of said pinch rollers adjustable toward and away from said at least one pinch roller.

11. Apparatus according to claim 1 including an optical sensor located to detect an edge of the filter media material, said sensor operatively connected to a motor driven adjustment screw for causing one end of said pinch rollers to move toward or away from each other.

12. Apparatus according to claim 1 wherein said reciprocable carriage is formed in half sections, one half section laterally adjustable toward and away from the other half section in a direction substantially perpendicular to said forward direction.

13. Apparatus according to claim 12 wherein said half sections are driven by a motor connected to each half section by separate drive belts and a common transverse spine shaft.

14. Apparatus according to claim 1 and including fixed side guides which maintain said side flaps open.

* * * * *